US011535234B2

(12) United States Patent
Duffy et al.

(10) Patent No.: US 11,535,234 B2
(45) Date of Patent: Dec. 27, 2022

(54) ENERGY MANAGEMENT SYSTEM FOR A HYBRID ELECTRIC GROUND VEHICLE

(71) Applicant: Deere & Company, Moline, IL (US)

(72) Inventors: Tyler J. Duffy, Fargo, ND (US); Dan Li, Fargo, ND (US); Long Wu, Fargo, ND (US); Eric Vilar, Dubuque, IA (US); Lauren M. White, Fargo, ND (US)

(73) Assignee: Deere & Company, Moline, IL (US)

( * ) Notice: Subject to any disclaimer, the term of this patent is extended or adjusted under 35 U.S.C. 154(b) by 214 days.

(21) Appl. No.: 16/946,554

(22) Filed: Jun. 26, 2020

(65) Prior Publication Data

US 2021/0253081 A1    Aug. 19, 2021

Related U.S. Application Data

(60) Provisional application No. 62/977,603, filed on Feb. 17, 2020.

(51) Int. Cl.
*B60W 20/13* (2016.01)
*B60W 10/06* (2006.01)
(Continued)

(52) U.S. Cl.
CPC ............ *B60W 20/13* (2016.01); *B60W 10/06* (2013.01); *B60W 10/08* (2013.01); *B60W 10/26* (2013.01); *B60W 2510/244* (2013.01)

(58) Field of Classification Search
None
See application file for complete search history.

(56) References Cited

U.S. PATENT DOCUMENTS 6,708,787 B2 *   3/2004   Naruse ................. E02F 9/2217
                                                     903/903
7,137,344 B2    11/2006   Kumar et al.
(Continued)

FOREIGN PATENT DOCUMENTS

EP      2832568 A1      2/2015
JP   2002242234 A  *  8/2002    ............. B60L 1/003
JP   2002242234 A     8/2002

OTHER PUBLICATIONS

Extended European Search Report and Written Opinion issued in European Patent Application No. 21152089.5, dated Jun. 28, 2021, in 10 pages.

*Primary Examiner* — Todd Melton
*Assistant Examiner* — Jason R Roberson

(57) ABSTRACT

An energy management control module is configured for communication with the vehicle controller. The energy management control module is configured to generate generator command data for the generator in a power command mode. In one embodiment, the energy management control module supports a first mode and a second mode. A first mode comprises the power command mode and a stored power extraction mode that are mutually exclusive modes for any sampling interval. In the power command mode of the first mode, the energy management controller is configured to generate generator command data for the generator based on a commanded motor torque and an energy storage power command (e.g., SOC command data) if the primary rotational energy of the internal combustion engine meets or exceeds the total vehicle load for a sampling interval.

15 Claims, 14 Drawing Sheets

(51) Int. Cl.
*B60W 10/08* (2006.01)
*B60W 10/26* (2006.01)

(56) References Cited

U.S. PATENT DOCUMENTS

| | | | |
|---|---|---|---|
| 7,532,960 B2 | 5/2009 | Kumar | |
| 8,214,097 B2 | 7/2012 | Severinsky et al. | |
| 2010/0268407 A1* | 10/2010 | Yanagisawa | B60K 6/46 180/65.265 |
| 2011/0098873 A1* | 4/2011 | Koga | B60L 50/40 180/65.265 |
| 2013/0151055 A1* | 6/2013 | Kaneko | E02F 9/2091 903/907 |
| 2014/0182279 A1* | 7/2014 | Wu | E02F 9/2075 60/484 |
| 2016/0340865 A1* | 11/2016 | Takeo | E02F 9/265 |
| 2017/0335547 A1 | 11/2017 | Wu et al. | |

* cited by examiner

ENERGY MANAGEMENT SYSTEM FOR A HYBRID ELECTRIC GROUND VEHICLE

RELATED APPLICATION

This document (including the drawings) claims priority and the benefit of the filing date based on U.S. provisional application No. 62/977,603, filed Feb. 17, 2020 under 35 U.S.C. § 119 (e), where the provisional application is hereby incorporated by reference herein.

DISCLOSURE

This disclosure relates to an energy management system for a hybrid electric ground vehicle.

BACKGROUND

In certain background art, an energy management system may control a generator output or an alternator output by primarily adjusting the engine speed of the engine that drives the generator or the alternator and by secondarily regulating the voltage output by the generator or the alternator, respectively. In some background art, the energy management systems do not consider the transient or fluctuating hydraulic loads associated with the implements of off-road work vehicles; particularly where the engine size restrictions, emissions regulations, or equipment cost may limit available energy output. Therefore, there is a need for an energy management system that supports fine control of the generator output and addresses transient hydraulic loads posed by implements.

SUMMARY

In one embodiment, an energy management system for a ground vehicle comprises an internal combustion engine for providing a primary rotational energy. A shaft assembly has an input shaft coupled to receive the primary rotational energy. The shaft assembly has a first output shaft and a second output shaft. A first vehicle load is coupled to the first output shaft for receipt of at least a first portion of the primary rotational energy. The first vehicle load comprises a hydraulic load of an implement of the vehicle. A first electric machine (e.g., generator) is coupled to the second output shaft to receive a second portion of the primary rotational energy. The first electric machine (e.g., generator) is operable to convert the received primary rotational energy into electrical energy. A second electric machine (e.g., motor) is configured to convert the electrical energy into secondary rotational energy at a rotor of the second electric machine (e.g., motor). A second load is coupled to the rotor for receipt of the secondary rotational energy. The second load associated with propulsion of the vehicle with respect to the ground.

A vehicle controller or energy management control module is configured for evaluation or management of a total vehicle load comprising the first load and the second load to determine if the primary rotational energy of the internal combustion engine meets or exceeds the total vehicle load. In one embodiment, vehicle controller or the energy management control module supports a first mode (e.g., peak load management) and a second mode (e.g., state-of-charge management). In the first mode, the energy management control module is configured to, or eligible to, generate generator command data for the generator based on a commanded motor torque and an energy storage power command (e.g., SOC command data) if the primary rotational energy of the internal combustion engine meets or exceeds the total vehicle load for a sampling interval. However, in first mode, alone or together with the second mode, the primary rotational energy of the internal combustion engine can be supplemented by stored electrical energy in the energy storage system to provide electrical energy to the motor to support the second vehicle load as a component of the total vehicle load if primary rotational energy of the internal combustion engine does not meet or exceed the total vehicle load for the sampling interval.

In another aspect of the disclosure, a second mode is configured to determine an observed state-of-charge (SOC) of the energy storage system with respect to a target SOC to determine whether to provide electrical energy to charge the energy storage system or to apply the electrical energy to electric machines that are mechanically coupled to the first vehicle load, the second vehicle load or both for the sampling interval or a following time interval.

DETAILED DESCRIPTION

Figure 1A:
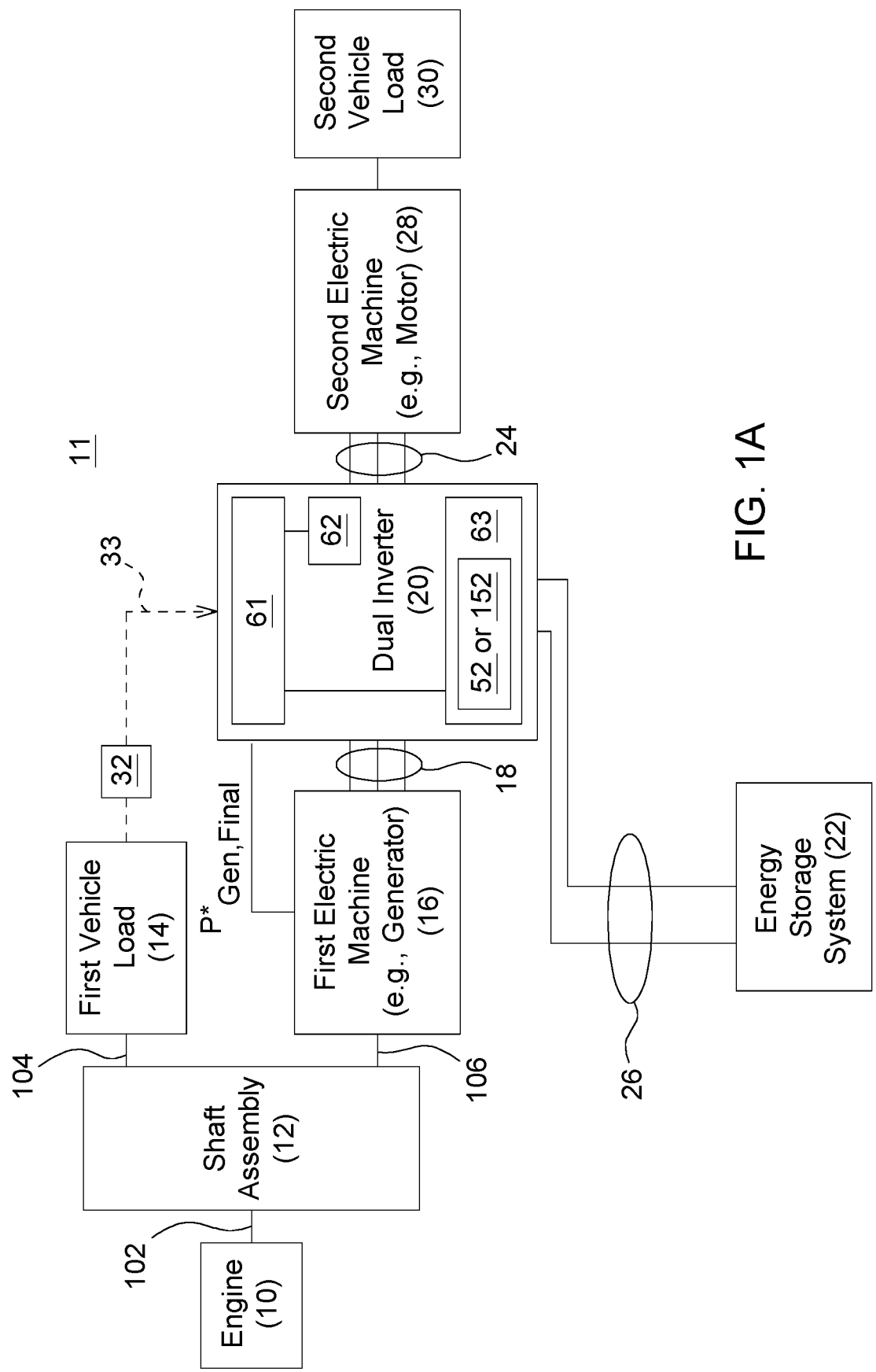
FIG. 1A is a block diagram of one embodiment of an energy management system for a hybrid ground vehicle.

In one embodiment in accordance with FIG. 1A, an energy management system 11 for a ground work vehicle (e.g., loader, excavator or other hybrid work vehicle) with propulsion from an internal combustion engine, electric machine, or both. The energy management system 11 comprises an internal combustion engine 10 for providing a primary rotational energy to a shaft assembly 12, or to one or more vehicle loads (14, 30) via a transmissive mechanical path for rotational energy. In one embodiment, a shaft assembly 12 comprises a gearbox, a transmission, or shafts that are otherwise rotationally coupled to each other via one or more gears, pulleys, wheels, clutch assemblies, or other arrangements. Subject to the direction or enable communication of a transmission control or vehicle controller, the shaft assembly 12 has an input shaft 102 rotationally or mechanically coupled to receive the primary rotational energy of the internal combustion engine 10. Conversely, subject to the direction or disable communication of a transmission control or vehicle controller, the shaft assembly 12 has an input shaft 102 rotationally or mechanically decoupled not to receive the primary rotational energy of the internal combustion engine 10. A vehicle controller or transmission controller can provide directions or communication of data messages to the shaft assembly 12 to control coupling or decoupling (and associated effective gear ratios or relative rotational speeds ratios) of any rotational energy between or among one or more of the following shafts: first input shaft 102, first output shaft 104 and second output shaft 106. For example, the shaft assembly 12 has a first output shaft 104 and a second output shaft 106, which can be coupled to or decoupled from the input shaft 102. Similarly, the first output shaft 104 and the second output shaft 106 can be coupled together for simultaneous rotation (e.g., at the same or different rotational rates) or decoupled from each other.

In FIG. 1A, a first vehicle load 14 is rotationally or mechanically coupled to the first output shaft 104 for receipt of at least a first portion of the primary rotational energy, which can be provided by the internal combustion engine 10. In one configuration, the first vehicle load 14 comprises a hydraulic load of an implement of the vehicle. A first electric machine 16 (e.g., generator 116 in FIG. 2A) is coupled to the second output shaft 106 to receive a second portion of the primary rotational energy, which can be provided by the internal combustion engine 10. The first electric machine 16 (e.g., generator 116 in FIG. 2A) is operable to convert the received primary rotational energy into electrical energy, while the first electric machine 16 operates in a generating mode. A second electric machine 28 (e.g., motor 128) is configured to convert stored or the generated electrical energy into secondary rotational energy at a rotor of the second electric machine 28, while the second electric machine 28 operates in a motoring mode.

In FIG. 1A, a vehicle second load 30 is coupled to the rotor of the second electric machine 28 for receipt of the secondary rotational energy, while the second electric machine 28 operates in a motoring mode. Conversely, during a braking/regenerating mode, the second electric machine 28 may generate electric energy from the rotation of the wheels or tracks of the work vehicle, where the dual inverter 20 may store the generated electric energy in the energy storage system 22. The second vehicle load 30 is associated with propulsion of the vehicle with respect to the ground by wheels, tracks, or ground engaging members that receive the secondary rotational energy via one or transaxles, transmissions, gearboxes, universal joints, drive shafts, or drive train components. The second load may vary with the slope of the terrain in the direction of travel, and acceleration, velocity or torque that is commanded or requested by an operator or programmed into control software (e.g., task or mission control software) data processing system of a vehicle. If the vehicle (e.g., tractor or planter) is working in an outdoor worksite that is subject to changes in ground moisture, soil moisture, ambient temperature, tidal flooding, weather, or other transient working conditions the operator may have a limited time window to perform a work task (e.g., planting) before working conditions become inhospitable or inefficient. Accordingly, the commanded or requested acceleration and velocity of the work vehicle may be increased (e.g., above standard levels of acceleration and velocity for fuel conservation or energy conservation) to fit within a limited time window to complete a work task or operation.

The first electric machine 16 can operate as a generator (e.g., 116 in FIG. 2A) in a generating mode (or in a braking mode) and as a motor in a motoring mode. Although the first electric machine 16 may be referred to primarily or synonymously as a generator (e.g., 116 in FIG. 2A), it is understood that the first electric machine 16 may comprise a generator, an alternator, a motor (e.g., an alternating current motor, an induction motor, an interior permanent magnet motor), or any combination of the above items. For example, during a motoring mode, the first electric machine 16 converts stored electric energy from the energy storage system 22 into secondary rotational energy to supplement or replace the primary rotational energy of the internal combustion engine 10 (e.g., to provide additional torque for moving the vehicle from a stationary position or up a hill or incline). Further, during the motoring mode, the first electric machine 16 can even provide secondary rotational energy to the first vehicle load 14 (e.g., hydraulic load) via the shaft assembly 12, such as by coupling of the first output shaft 104 and the second output shaft 106 for mutual rotation (e.g., at the same or different rotational rates), with or without coupling of primary rotational energy from coupling or decoupling (e.g., by clutches of the shaft assembly 12) of the engine 10.

Similarly, the second electric machine 28 can operate as a motor (e.g., 128 in FIG. 2) in a motoring mode and as a generator in a generating mode or braking mode, which can particularly applicable to maintaining a target working ground speed and generating electrical energy while an off-road work vehicle is moving downhill in sloped terrain. Although the second electric machine 28 may be referred to primarily or synonymously as a motor (e.g., 128 in FIG. 2A), it is understood that the second machine may comprise a generator, an alternator, a motor, or any combination of the above items.

A dual inverter 20 may comprise a primary inverter for controlling or supporting the first electric machine 16 and a secondary inverter for controlling or supporting the second electric machine 28. The dual inverter 20 is coupled to the electric machines (16, 28) and to the energy storage system 22. A dual inverter 120 comprises primary alternating current (AC) terminals 18, secondary AC terminals 24, and DC terminals 26. The DC terminals 26 are coupled to the energy storage system 22; the primary AC terminals 18 are coupled to the first electric machine 16 (e.g., generator) and the secondary AC terminals 24 coupled to the second electric machine 28 (e.g., motor).

In an alternate embodiment, the dual inverter 20 may be replaced by two separate inverters or discrete inverters, or motor controllers.

In one embodiment, the energy storage system 22 is configured for storing electrical energy in a direct current (DC) form, such as electrical energy generated by the first electric machine 16 in a generating mode, or generated in a vehicle braking mode of the second electric machine 28.

In FIG. 1A, the dual inverter 20, a energy management control module (52 or 152), and/or a vehicle controller 50 (in FIG. 2B or FIG. 2D) is configured for evaluation or management of a total vehicle load comprising the first load (e.g., hydraulic implement load of an off-road work vehicle) and the second load (e.g., ground propulsion load associated with wheels or tracks of the off-road work vehicle) to determine if the primary rotational energy of the internal combustion engine 10 meets or exceeds the total vehicle load. The total vehicle load may include load contributions or load data from the first load and the second load during or for any of the following time periods: one or more sampling intervals, a work session, a work session history for a corresponding worksite or fleet of work vehicles, or historical performance of the work vehicle.

As illustrated in FIG. 1A, an optional sensor 32 (e.g., load sensor) is associated with a first vehicle load 14. The sensor 32 may measure the load data associated with the first vehicle load 14 to generate sensor data 33 for one or more sampling intervals, for a work session, or otherwise. For example, the optional sensor 32 may measure load data, such as torque data, speed data for a rotor or shaft associated with the first vehicle load 14. Further, the optional sensor 32 may report measured load data to the dual inverter 20 or a vehicle controller via a vehicle data bus, a vehicle local area network, a vehicle local wireless network, or other communications line.

In one embodiment, the dual inverter 20 has torque data, speed data for the rotor of the second electric machine 28, such as commanded torque, observed torque, commanded rotor speed and observed rotor speed of the second electric machine 28, via an encoder, a resolver, or one or more sensors associated with the rotor of the second electric machine 28. Alternately, the dual inverter 20 estimates torque, speed data for the rotor of the second electric machine 28 through observation of secondary AC signals 24 by a sensorless estimator of the dual inverter 20. Accordingly, the dual inverter 20, energy management control module 52, or vehicle controller can estimate the total vehicle load based on the available load data, such as available torque and speed data, associated with the first vehicle load 14 and the second vehicle load 30 for one or more sampling intervals or a work session of a vehicle.

Figure 1B:
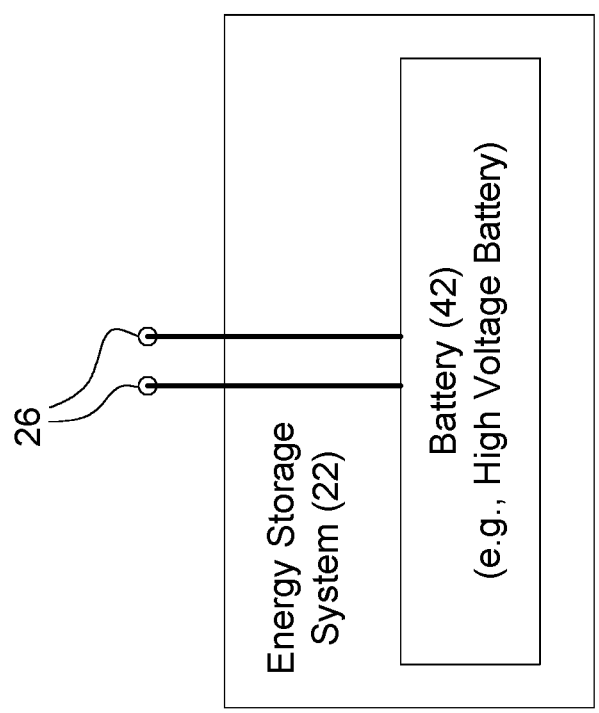
FIG. 1B is a block diagram of a first embodiment of an energy storage system associated with the energy management system.

FIG. 1B is a block diagram of a first embodiment of an energy storage system 22 associated with the energy management system 11. In FIG. 1B, the energy storage system 22 is coupled to the DC terminals 26 (e.g., DC link) of the dual inverter 20. The energy storage system 22 may comprise a battery 42 (e.g., high voltage battery, such as 600 VDC battery) coupled to or connected directly to the DC terminals 26 of the dual inverter 20. In alternate embodiments, filter circuits or capacitors may be added to filter the DC ripple current that might otherwise be introduced to the battery 42 from the dual inverter 20.

Figure 1C:
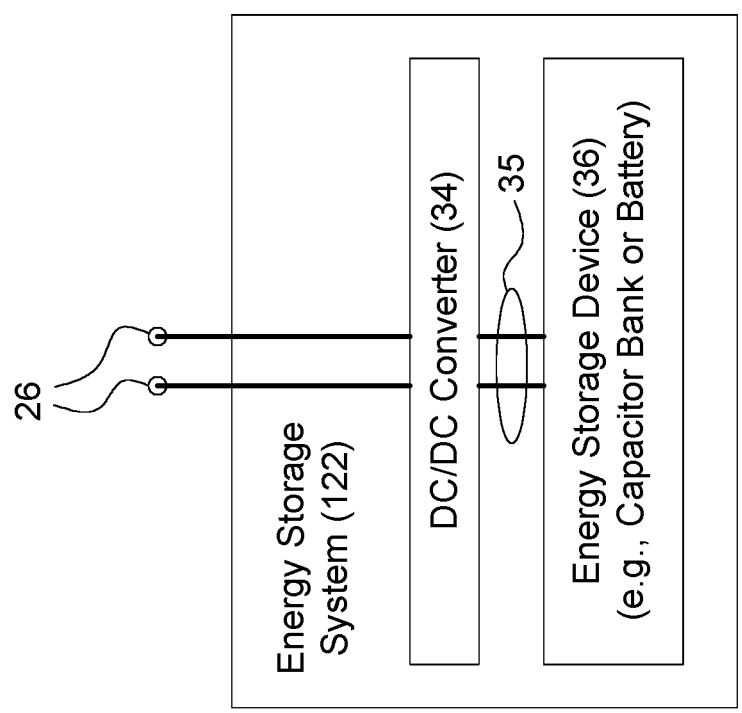
FIG. 1C is a block diagram of a second embodiment of an energy storage system associated with the energy management system.

FIG. 1C is a block diagram of a second embodiment of an energy storage system 122 associated with the energy management system 11. The energy storage system 122 may comprise a DC/DC converter 34 with a first port coupled to the DC terminals 26 and a second port 35 coupled to an energy storage device 36, such as a capacitor bank, an ultracapacitor, or a battery. In one embodiment, at the DC terminals 26 of the dual inverter 20, the direct current bus voltage may be greater than a storage-device DC voltage of the energy storage device 36, such as a battery DC voltage. For instance, the DC bus voltage of the dual inverter 20 may comprise a first DC voltage value (e.g., 600 VDC) and the storage-device DC voltage may comprise a second DC voltage value (e.g., 350 VDC or lower), where the first DC voltage value is greater than the second DC voltage value. Accordingly, the DC/DC converter 34, or direct-current to direct-current converter circuit, may comprise a step-down converter that steps down the DC voltage from the first port (e.g., input port) to the second port 35 (e.g., output port).

Figure 1D:
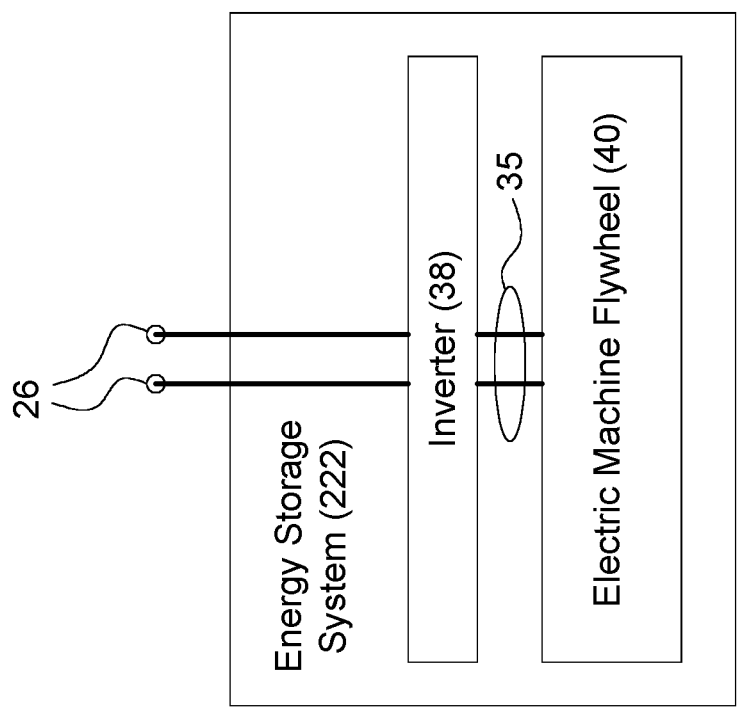
FIG. 1D is a block diagram of third embodiment of an energy storage system associated with the energy management system.

FIG. 1D is a block diagram of third embodiment of an energy storage system 222 associated with the energy management system 11. The energy storage system 222 is coupled to the DC terminals 26 (e.g., DC bus) of the dual inverter 20. As illustrated in FIG. 1D, an additional inverter 38 has a first port coupled to the DC terminals 26 of the dual inverter 20. The additional inverter 38 has a second port 135 coupled to alternating current terminals of an electric machine flywheel. The additional inverter 38 is configured to control the operation or motion of the electric machine flywheel 40 to manage energy storage from the DC bus of the dual inverter 20 and energy transmission to the DC bus of the dual inverter 20. For example, the electric machine flywheel 40 may comprise a motor or a generator coupled to a flywheel. Further, if the electric machine flywheel 40 is rotating during a time period, the rotating flywheel represents stored rotational energy that can be released to the DC bus (at DC terminals 26) by the inverter 38 operating in a generating mode or braking mode of the electric machine flywheel 40. Conversely, a stationary or rotating flywheel may store supplemental or additional rotational energy by the inverter 38 converting DC electrical energy on the DC bus to AC electrical energy that increases the rotational speed or velocity of the electric machine flywheel 50 in the motoring mode.

Figure 2A:
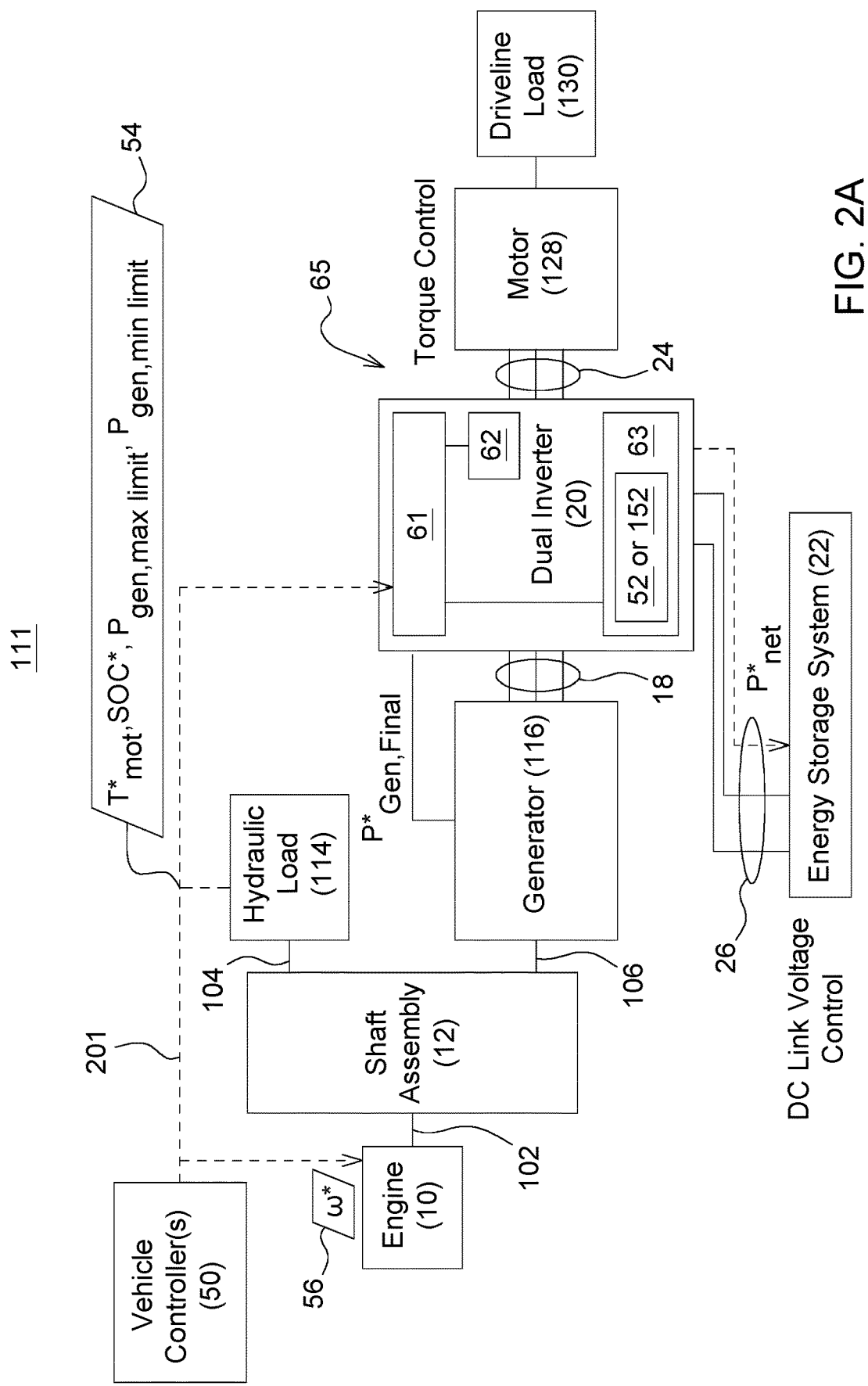
FIG. 2A is a block diagram of another embodiment of an energy management system for a hybrid electric ground vehicle, such as a loader.

In FIG. 2A, the dual inverter 20 can generate motor command data for the second electric machine, which is referred to as motor 128, in a torque control mode or speed control mode based on data messages of the vehicle controller 50. In FIG. 2A, dual inverter 20 or the energy management control module (52, 152) is configured for communication with the vehicle controller 50. A vehicle controller 50 is configured for evaluation or management of a total vehicle load comprising the first load and the second load to determine if the primary rotational energy of the internal combustion engine meets or exceeds the total vehicle load.

The dual inverter 20, or the energy management control module (52, 152), is configured to generate generator-command data for the generator 116 in a power-command mode. Within the hybrid driveline or propulsion system, the generator 116 can be a different electric machine than the motor 128. In one embodiment, the energy management control module 52 supports a first mode and a second mode. A first mode comprises a power-command component and a stored power-extraction component that are mutually exclusive procedures, arrangements or sub-modes for any sampling interval. In the power-command component of the first mode, the energy management control module 52 is configured to generate generator-command data for the first electric machine for the generator 116 in FIG. 2A based on a commanded motor torque and an energy storage power-command (e.g., SOC command data) if the primary rotational energy of the internal combustion engine 10 meets or exceeds the total vehicle load for a sampling interval.

In the stored power-extraction component of the first mode, the primary rotational energy of the internal combustion engine 10 is supplemented by stored electrical energy in the energy storage system 22 to provide electrical energy to the second electric machine, which is referred to as motor 128 in FIG. 2A, to support the second vehicle load or driveline load 130 as a component of the total vehicle load if primary rotational energy of the internal combustion engine 10 does not meet or exceed the total vehicle load for the sampling interval. Further, in the stored power-extraction component of the first mode, the electrical energy storage could be used to support the first vehicle load (e.g., hydraulic load 114 in FIG. 2A), the second vehicle load (e.g., driveline load 130 in FIG. 2A), or both the first vehicle load and the second vehicle load. For example, in FIG. 1A if the first vehicle load 14 (e.g., hydraulic load by itself) exceeds the primary rotational energy (or total capacity) of the internal combustion engine 10, the stored electrical energy in the energy storage system 22 would be transferred to the first vehicle load 14 (e.g., hydraulic load) through the shaft assembly 12 (e.g., gearbox) by the first electric machine 16. Similarly, in FIG. 2A if the hydraulic load 114, by itself, exceeds the primary rotational energy (or total capacity) of the internal combustion engine 10, the stored electrical energy in the energy storage system 22 would be transferred to the hydraulic load 114 through the shaft assembly 12 (e.g., gearbox) by the generator 116 or first electric machine operating in a motoring mode.

A second mode is configured to determine an observed state-of-charge (SOC) of the energy storage system 22 with respect to a target SOC to determine whether to provide electrical energy to charge the energy storage system 22 or to discharge the energy storage system 22 for the sampling interval or a following time interval. In one embodiment, the energy management control module (52, 152) of the dual inverter 20 manages the discharge or charging of the energy storage system based on the observed SOC and the target SOC in accordance with one or more examples, which may be applied separately or cumulatively.

In a first example for SOC management, the energy management control module (52, 152) discharges the energy storage system 22 by providing stored electrical energy to the first vehicle load 14 (e.g., hydraulic load 114 in FIG. 2A), the second vehicle load 30 (e.g., driveline load 130 in FIG. 2A), or both, such as during a sampling interval when the observed SOC is higher that a target SOC.

In a second example of SOC management, the energy management control module (52, 152) discharges the energy storage system 22 by providing stored electrical energy to a selectable or switchable electrical load (e.g., a switched vehicle load, a resistive load, first vehicle load 14, second vehicle load 30) to discharge the energy storage system 22 for the sampling interval or a following time interval, where the energy management control module (52, 152) can control one or more switches or a switching matrix to couple or decouple, selectively upon command, the energy storage system 22 to the selectable or switchable electric load for one or more sampling intervals.

In a third example of SOC management, the energy management control module (52, 152) charges the energy storage system 22 by providing energy transfer from a motor 128 (in FIG. 2A) that operates in a regenerative braking during one or more sampling intervals. During the regenerative braking, the controller (52, 152) decides whether to use the regenerative braking energy to charge the energy storage system 22 (e.g., battery) or to power the hydraulic load 144 by operating the generator 116 in a motoring mode to rotate the first output shaft 106, while it is in a coupled state to the second output shaft 104 via the shaft assembly 12, to drive the hydraulic load 114.

In a fourth example of SOC management, the energy management controller (52, 152) manages the charging or discharging of the energy storage system 22 or its energy storage device (e.g., battery) while the energy management system 22 is operating in the first mode, the second mode, or both.

In one embodiment, the dual inverter 20 comprises a data bus 61, an electronic data processor 62 coupled to the data bus 61, and a data storage device 63 coupled to the data bus 61. The data storage device 63 is adapted to store the energy management control module (52, 152) as software instructions within the data storage device 63 for execution or processing by the electronic data processor 62.

In one embodiment, the electronic data processor 62 comprises a microcontroller, a microprocessor, a programmable logic array, an application specific integrated circuit, digital signal processor, a logic circuit, an arithmetic logic unit, or another data processing device for processing or manipulating data. The data storage device 63 may comprise electronic memory, non-volatile random access memory, an optical storage device, a magnetic storage device, a hard disk drive, or the like.

In FIG. 2A through FIG. 2D, inclusive, the energy management control module (52, 152) may operate in accordance with one or more modes, which may be applied separately or cumulatively. The energy management control module (52, 152) may be referred to synonymously as the EMCM through the document and drawings.

Under the first mode in the stored power-extraction mode, the primary rotational energy of the internal combustion engine 10 is supplemented by stored electrical energy in the energy storage system 22 to provide electrical energy to the first electric machine 16 (e.g., generator 116 of FIG. 2A) in a motoring mode to support the first vehicle load 14 (e.g., hydraulic load 114 of FIG. 2A) as a component of the total vehicle load if the energy management control module (52, 152) determines that primary rotational energy of the internal combustion engine 10 does not meet or exceed the total vehicle load. Accordingly, in the stored power-extraction mode, the energy management control module (52, 152) is configured to generate one or more changes to a generator-command data, a motor-command data, or an SOC command data by a control algorithm to shave/reduce peak load for any sampling interval by drawing stored energy from an energy storage system 22 for the sampling interval or next sampling interval or a window following the sampling interval based on: (a) a commanded engine speed (e.g., commanded by the vehicle controller 50), (b) a commanded torque or commanded speed of the motor 128 (e.g., that is commanded by the vehicle controller 50); (c) a present total vehicle load; (d) a commanded generator power (e.g., of generator 116), and (e) a state of charge (SOC) of an energy storage system 22 comprising an observed SOC and a commanded SOC of the energy storage system 22.

Under a second mode, the energy management control module 52 is configured to determine an observed state of charge (SOC) of the energy storage system 22 with respect to a target SOC of the energy storage system 22 to determine whether to provide electrical energy to charge the energy storage system 22 or to discharge the energy storage system 22 for the sampling interval or a following time interval.

Under a third mode, the energy management control module (52, 152) is configured to control a DC bus voltage at the DC output terminals 26 of the dual inverter 20 pursuant to a voltage control mode. For example, in the third mode the energy management control module (52, 152) or dual inverter is adapted to generate and send a net power command (P*net) to the energy storage system 22. The net power command (P*net) to the energy storage system 22 originates from the dual inverter 20 or its energy management control module (52, 152).

Under a fourth mode, the energy management control module (52, 152) comprises one or more of the following software modules or sets of software instructions: (1) a power management module storable in a data storage device 63 to support the first mode and (2) a state-of-charge (SOC) module storable in a data storage device 63 to support the second mode. For example, the power management module (of the EMCM 52) comprises a limiter for limiting power output at or between a lower limit and an upper limit. Further, in certain configurations, the SOC data outputted by the SOC module is configured to provide an input to the power management module or EMCM 52 for generation of a generator-power commanded output (e.g., $P^*_{Gen,Final}$) that can be provided, directly via a communications link or indirectly via the vehicle data bus 201, to the first electric machine 16 (e.g., generator 116).

Figure 2B:
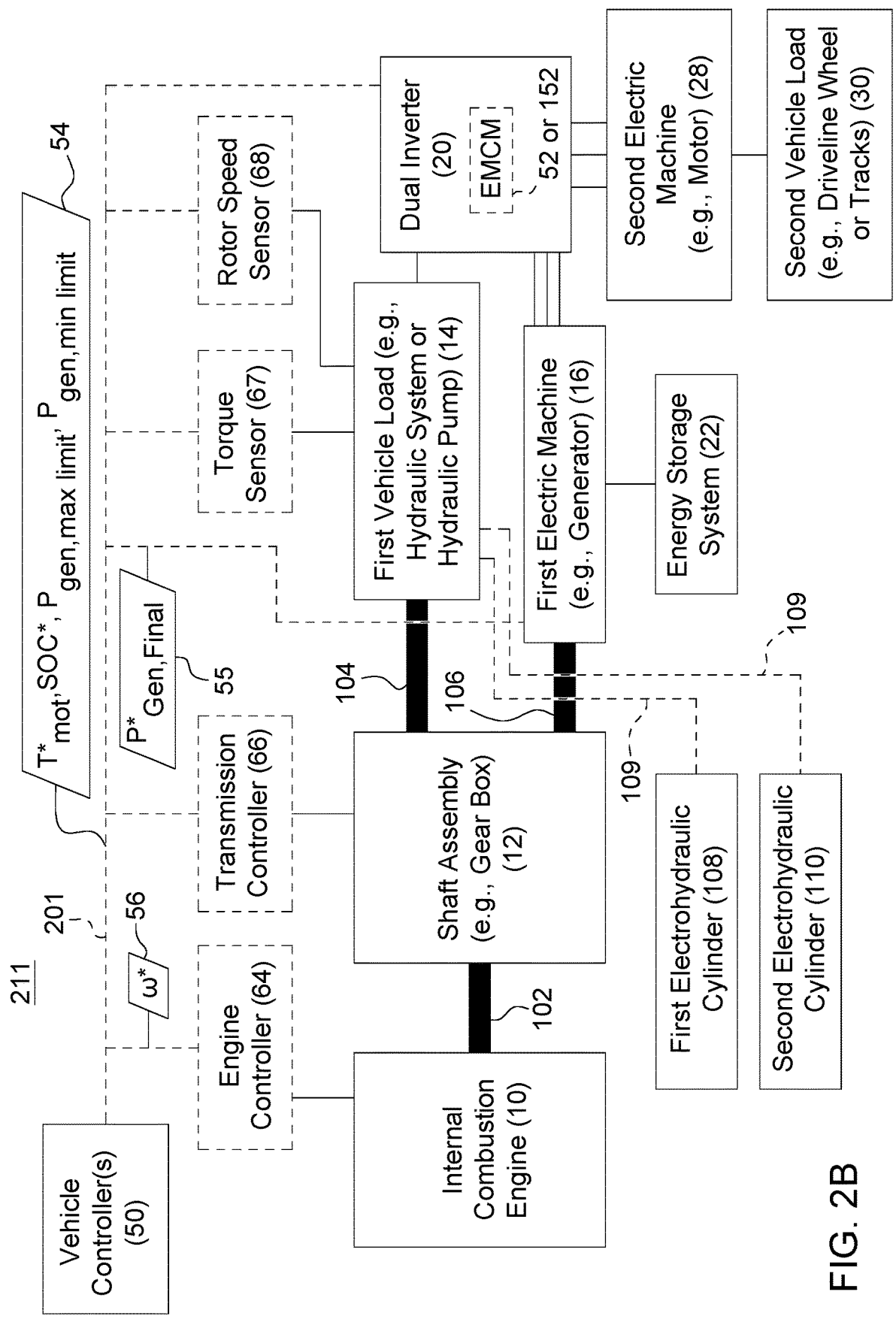
FIG. 2B is a block diagram of yet another embodiment of an energy management system for a hybrid electric ground vehicle, such as a loader, with a transmission controller and torque and speed sensors.

In one embodiment, as illustrated in FIG. 2B, the vehicle controller 50 determines the lower limit and the upper limit on a regular basis or an iterative basis over one or more sampling intervals. Because the vehicle controller 50 is commanding the amount of hydraulic power associated with the first hydraulic load 14, such as a hydraulic system or hydraulic pump, the first electric machine lower limit (e.g., generator lower limit) can be found by assuming the engine provides full power in accordance with the following equation:

$P_{gen\_min} = P_{hydraulic} - P_{engine\_max}$, where $P_{gen\_min}$ is lower power limit of the first electric machine 16, $P_{hydraulic}$ is the amount of hydraulic power associated with the first hydraulic load 14, and $P_{engine\_max}$ is the maximum power of the primary rotational energy of the internal combustion engine 10.

Similarly, the vehicle controller 50 can determine the first electric machine upper power limit (e.g., generator upper limit) by assuming the internal combustion engine 10 provides no power in accordance with the following equation:

$P_{gen\_max} = -P_{hydraulic}$, where $P_{gen\_min}$ is lower power limit of the first electric machine 16, $P_{hydraulic}$ is the amount of hydraulic power associated with the first hydraulic load 14, and $P_{engine\_max}$ is the maximum power of the primary rotational energy of the internal combustion engine 10.

For example, in accordance with the above equations, if the first vehicle load 14 (e.g., observed hydraulic load) is measured at 10 kW (Kilowatts) of hydraulic power for a sampling interval and if the internal combustion engine 10 is capable of 100 kW of engine power, the generator lower power limit is −90 kW.

In one illustrative example, the generator lower power limit represents the amount of energy the first electric machine 16 can draw or pull from the energy storage system 22 during one or more sampling intervals. Returning to the above example, the first electric machine 16 (e.g., generator) can draw or pull up to 90 kW of electrical power to support provision of energy from the energy storage system 22 to the first vehicle load 14 (e.g., hydraulic loads), the second vehicle load 30 or both.

In another illustrative example, the generator upper power limit represents the amount of energy the first electric machine 16 can push or store into energy storage system 22 during one or more sampling intervals. The upper power limit can mean 10 kW of electrical power to support provision of energy to the energy storage system 22. Further, rather than store the generated electrical energy of the first electric machine 15 (e.g., generator) in the energy storage system 22, the first electric machine 16 could divert or push up to 10 kW of rotational energy back onto the shaft assembly 12 or gearbox to support the first vehicle load 14 (e.g., hydraulic load).

In FIG. 1A and in FIG. 2A, an internal combustion engine 10 provides primary rotational energy to support one or more vehicle loads (14, 114, 30, 130) through a shaft assembly 12, such as a gearbox or a transmission. A shaft assembly 12 has an input shaft 102 coupled to receive the primary rotational energy. The shaft assembly 12 has a first output shaft 104 and a second output shaft 106. A first vehicle load 14 is coupled (e.g., rotatably or mechanically coupled) to the first output shaft 104 for receipt of at least a first portion of the primary rotational energy. A second vehicle load 30 is coupled to the second output shaft 106 of the shaft assembly 12 via an intervening electromechanical combination of the first electric machine 16 (e.g., generator 116), dual inverter 20, and second electric machine 28 (e.g. motor 128).

In FIG. 1A and in FIG. 2A, an energy management system (11, 111) comprises an electric drive system 65 that has first electric machine 16 (e.g., generator 116), a dual inverter 20, a second electric machine 28 (e.g., motor 128), and an energy storage system 22. The electric drive system 65 provides rotational energy to the second vehicle load 30 or driveline load 130.

In one embodiment, the energy management control module (52, 152) may comprise software instructions, data, or an algorithm that is stored in a data storage device of the dual inverter 20. In an alternate embodiment, the energy management control module (52, 152) may be configured or reconfigured as separate controller that provides an interface between the dual inverter 20 and the energy storage system 22 or energy storage device. Regardless of whether the energy management controller (52, 152) is integral with or embedded in the dual inverter 20, the energy management control module (52, 152) is coupled to or in communication with one or more vehicle controllers 50 (e.g., via a vehicle data bus 201) to manage the primary rotational energy provided by the internal combustion engine 10, to manage the secondary rotational energy provided by the electric drive system 65, and to manage the state of charge of the energy storage system 22, along with storage and withdrawal electrical energy from the energy storage system 22.

In one embodiment, the energy management control module (52,152) controls the power flow from the two sources of energy: the engine 10 and the energy storage system 22 within the hybrid vehicle. The energy management control module (52, 152) is configured to accomplish one or more of the following: (a) supplement engine power or the primary rotational energy during times of peak loads of the total vehicle load; (b) regulate the state-of-charge (SOC) of the energy storage system (22, 122, 222) or its energy storage devices (42, 36, 40) to control or authorize energy storage (e.g., charging) and energy withdrawal (e.g., discharging) from the energy storage system (22, 122, 222); and (c) maintain voltage regulation of the DC bus or DC link voltage of the dual inverter 20.

First, the energy management control module (52, 152) is configured to supplement engine power during times of peak vehicle loads or peak engine loads. For example, the energy management control module (52, 152) is configured to provide power to: (1) vehicle loads (30, 130) that are electrically coupled to alternating current (AC) output terminals 18 of the first electric machine 16 or the generator 116, such as the second electric machine 28 and second vehicle load 30 of FIG. 1A, or such as the motor 128 and driveline load 130 of FIG. 2A; and (2) vehicle loads (30, 130) that are mechanically coupled to rotor of second electric machine 28 of FIG. 1A, or rotor of generator 128 of FIG. 2A, in accordance with alternate processes in which the shaft assembly 12 or gearbox clutches are appropriately activated/deactivated to transmit the rotational power.

Second, the energy management control module (52, 152) is adapted to regulate the energy storage state-of-charge (SOC) of the energy storage system (22, 122, 222) or its energy storage device (42, 36, 40), such as battery 42. In one embodiment, the energy management control module (52, 152) is configured to charge or discharge the energy storage device (42, 36, 40) based on the current state-of-charge (SOC). For example, after power from the energy storage device (42, 36, 40) or energy storage system (22, 122, 222) is used to supplement engine power during times of peak loads, the control system (11, 111) must identify when excess engine power is available to recharge the energy storage device (42, 36, 40) or energy storage system (22, 122, 222).

Third, the energy management controller (52, 152) is configured to maintain robust DC bus voltage at the DC terminals 26 of the dual inverter 20. For example, the dual inverter 20 is connected to the motor 128 and generator 116; robust control of the DC bus voltage is required for robust electric machine torque control of the motor 128, the generator 116 or both at the respective AC terminals (18, 24).

FIG. 2A is a block diagram of another embodiment of an energy management system 111 for a hybrid electric ground vehicle, such as a loader. The energy management system 111 of FIG. 2A is similar to the energy management system 11 of FIG. 1A, except the energy management system 111 of FIG. 2A is tailored or directed toward the energy management system for a hybrid loader ground vehicle. Like reference numbers in FIG. 1A and FIG. 2A indicate like elements.

In FIG. 2A, the electric drive system 65 comprises the combination of the generator 116, dual inverter 20, motor 128 and energy storage system 22. The electric drive system 65 is configured drive the traction driveline load 130 (or second vehicle load 30), which propels or moves the vehicle with respect to the ground. For example, the motor 128 may comprise one or more hub motors 128 that are integrated into the hubs of the wheels or rotors associated with rotor tracks (e.g., flexible ground-engaging polymeric or polymeric composite belts) of the hybrid loader ground vehicle.

In FIG. 2A, the vehicle controller 50 can provide engine shaft speed commands (e.g., $\omega^*$) to the internal combustion engine 10 or its electronic engine controller. Engine shaft speed commands are typically expressed in commanded radians or revolutions per unit time for the crankshaft of the internal combustion engine 10. Similarly, the vehicle controller 50 can provide commanded motor torque ($T^*_{mot}$) for the dual inverter 20 to control motor 128, commanded state-of-charge (e.g., SOC*) for the dual inverter 20 to control energy storage system 22, and power generation limits (e.g., $P_{gen,max}$, $P_{gen,min}$, $P_{gen,max\_limit}$, $P_{gen,min\_limit}$) for the inverter 20 to control the generator 116. The dual inverter 20 can provide torque commands, speed commands, or both to the generator 116 and the motor 128 for control consistent with or based on the commanded torque ($T^*_{mot}$) to control motor 128, and the power generation limits (e.g., $P_{gen,max}$, $P_{gen,min}$, $P_{gen,max\_limit}$, $P_{gen,min\_limit}$) to control the generator 116. The dual inverter 20 can provide DC voltage control of the DC bus at DC terminals 26 between the dual inverter 20 and the energy storage system 22.

In one embodiment, the dual inverter 20 or its energy management control module (52, 152) determines the amount of power to pull from or push to the gearbox and the amount of power to pull from or push to the energy storage device 36. In one embodiment, the energy management control module (52, 152) comprises the intelligent power management control software, software instructions or a software routine that is storable in a data storage device. In one illustrative example, the dual inverter 20, or its energy management control module 52, receives input data from the vehicle controller 50, such as the following input data messages: a commanded state-of-charge (SOC) of the energy storage device (36 40, 42) within the energy storage system 22 to manage the charge and discharging of the energy storage device, where the charging is limited by generator constructions of the generator 116, such as a maximum generator power limit, and a minimum generator power limit (e.g., $P_{gen,max}$, $P_{gen,min}$, $P_{gen,max\_limit}$, $P_{gen,min\_limit}$).

The energy management system (52, 152) for a hybrid loader ground vehicle comprises an internal combustion engine 10 for providing a primary rotational energy. A shaft assembly 12 comprises a gearbox, transmission, gear, rotor and clutch assemblies, or other mechanism for transmitting, varying gear ratios or relative rotational speed, coupling, decoupling rotational energy between input/output shafts (102, 104, 106). The shaft assembly 12 has an input shaft 102 coupled to receive the primary rotational energy. The shaft assembly 12 has a first output shaft 104 and a second output shaft 106.

In one embodiment, a first vehicle load 14 is coupled to the first output shaft 104 for receipt of at least a first portion of the primary rotational energy. The first vehicle load 14 comprises a hydraulic load 114, such as hydraulic implement load of a loader, an excavator or another work vehicle. In one embodiment, the aggregate hydraulic implement load comprises: (1) a first hydraulic load component associated with a first actuator or first electrohydraulic cylinder (e.g., 108 in FIG. 7 or in FIG. 8) for lifting, raising or lowering a boom or arm of the loader, excavator or work vehicle; and (2) a second hydraulic load associated with a second actuator or second electrohydraulic cylinder (e.g., 110 in FIG. 7 or in FIG. 8) for tilting a tool, fork or bucket of the loader, excavator or work vehicle. Further, in a third hydraulic load may be associated with a third actuator a third electrohydraulic cylinder (e.g., 804 in FIG. 8) for moving an arm of an excavator or work vehicle.

In FIG. 2A, a generator 116 is coupled to the second output shaft 106 to receive a second portion of the primary rotational energy consistent with operation in the first mode, the second mode or both the first mode and the second mode simultaneously. Under the direction or commanded data of the vehicle controller 50 in conjunction with the dual inverter 20, the generator 116 is operable to convert the received primary rotational energy into alternating current (AC) electrical energy. A first load or hydraulic load 114 can be coupled, or decoupled, to first output shaft 104 of the shaft assembly 12. The first load can be defined based on: (a) observed or estimated first load motion data, such as torque data, rotational speed data, velocity data and acceleration data; and/or (b) observed or estimated hydraulic pressure data, and observed or estimated hydraulic flow data, and/or (c) a hydraulic observer model in the energy management control module (52, 152) of the inverter 20 that models direct-axis current and quadrature-axis current measurements, that models alpha-beta reference frame measurements, or that models other electric machine measurements observed when in the motoring mode of the generator 116 (or the first electric machine) 16. For example, the hydraulic observer model obtains electric machine measurements of the generator 116 when in the motoring mode the generator 116 is solely providing secondary rotational energy to the hydraulic load 114 (or first load 14) via first output shaft 104 that is solely coupled to the second output shaft 106. Further, in the hydraulic observer model the electric machine measurements of the generator 116 are preferably made when the engine 10 has its engine shaft decoupled from the first output shaft 104 and the second output shaft 106 by the shaft assembly 12, such as clutches within the shaft assembly 12. Alternately, if the primary rotational energy of the engine 10 and the secondary rotational energy of the generator 116 in the motoring mode are simultaneously applied to the hydraulic load 114 for one or more sampling intervals, the hydraulic observer model can adjust the electric machine measurements of the generator 116 by subtracting contributions of the primary rotational energy of the then-active engine 10 from the secondary rotational energy for one or more sampling intervals.

Under the direction or commanded data of the vehicle controller 50 in conjunction with the dual inverter 20, a motor 128 is configured to convert the electrical energy into secondary rotational energy at a rotor of the motor 128 consistent with operation in the first mode, the second mode or both the first mode and the second mode simultaneously. A second load or driveline load 130 is coupled to the rotor of the motor 128 for receipt of the secondary rotational energy. For example, the second load is associated with propulsion of the loader vehicle with respect to the ground. The second load can be defined based on: (a) observed or estimated second load motion data, such as torque data, rotational speed data, velocity data and acceleration data and/or (b) a motor observer model in the energy management control module (52, 152) of the inverter 20 that models direct-axis current and quadrature-axis current measurements, that models alpha-beta reference frame measurements, or that models other electric machine measurements observed when in the motoring mode of the motor 128 (or the second electric machine) 28.

An energy storage system 22 is configured for storing energy in a direct current (DC) form. A dual inverter 20 comprises primary alternating current (AC) terminals 18, secondary AC terminals 24, and DC terminals 26; the DC terminals 26 coupled to the energy storage system 22. The primary AC terminals 18 are coupled to the generator 116 and the secondary AC terminals 24 coupled to the motor 128.

In one embodiment, the vehicle controller 50 is configured for management of a total vehicle load (e.g., total rotational load for one or more sampling intervals) comprising the first vehicle load (14, 114) and the second vehicle load (30, 130) to determine if the primary rotational energy of the internal combustion engine 10 meets or exceeds the total load (e.g., total rotational load for one or more sampling intervals).

A vehicle controller 50, an energy management control module (52, 152) or dual inverter 20 is adapted to support one or more control modes, which may be implemented separately or cumulatively.

In the first mode (e.g., in an energy-storage eligible sub-mode of the first mode), the vehicle controller 50, dual inverter 20, or the energy management control module (52, 152) is configured to, or eligible to, generate generator command data (e.g., $P^*_{Gen,Final}$) for the generator (16, 116) based on a commanded motor torque (e.g., $T^*_{mot}$) and an energy storage power command (e.g., SOC* or SOC command data) if the primary rotational energy of the internal combustion engine meets 10 or exceeds the total vehicle load for a sampling interval. For example, the dual inverter 20 may determine to store commanded power ($P^*_{net}$) in the energy storage system 22 for one or more sampling intervals based on: (a) an engine power capability or maximum power capacity of the internal combustion engine 10 at a commanded speed that is commanded by the vehicle controller 50 via the dual inverter 20, (b) a commanded torque or commanded speed of the motor (28,128) that is commanded by the vehicle controller 50 via the dual inverter 20; (c) a present total vehicle load observed by sensors associated with the first electrohydraulic cylinder 108 and the second electrohydraulic cylinder 110; (d) a commanded generator power ($P^*_{Gen,Final}$) of the generator 116 commanded by the energy management module (52, 152) or inverter 20, and (e) an observed state-of-charge (SOC) of an energy storage system 22, and/or a commanded state of charge (SOC) of an energy storage system 22 derived from an observed SOC and target SOC of the energy storage system 22.

However, in first mode (e.g., in an energy-extraction sub-mode of the first mode), alone or together with the second mode, the primary rotational energy of the internal combustion engine 10 can be supplemented by stored electrical energy in the energy storage system 22 to provide electrical energy to the motor (28, 128) to support the second vehicle load (30, 130) as a component of the total vehicle load if primary rotational energy of the internal combustion engine 10 does not meet or exceed the total vehicle load for the sampling interval. For example, if primary rotational energy of the internal combustion engine 10 does not meet or exceed the total vehicle load for the sampling interval, in the first mode the vehicle controller 50, the dual inverter 20, or energy management control module (52, 152) is configured to generate one or more changes to a generator limit data, commanded motor data, and commanded SOC data by a control algorithm to shave/reduce peak vehicle load for any sampling interval by drawing stored energy from an energy storage system 22 for the sampling interval or next sampling interval or a window following the sampling interval based on: (a) an engine power capability or maximum power capacity of the internal combustion engine 10 at a commanded speed that is commanded by the vehicle controller 50 via the dual inverter 20, (b) a commanded torque or commanded speed of the motor 128 that is commanded by the vehicle controller 50 via the dual inverter 20; (c) a present total vehicle load observed by sensors associated with the first electrohydraulic cylinder 108 and the second electrohydraulic cylinder 110; (d) a commanded generator power ($P^*_{Gen,Final}$) of the generator 116 commanded by the energy management module (52, 152) or inverter 20, and (e) an observed state-of-charge (SOC) of an energy storage system 22, and/or a commanded state of charge (SOC) of an energy storage system 22 derived from an observed SOC and target SOC of the energy storage system 22.

Under a second control mode, which can be applied separately or cumulatively, simultaneously with the first mode, the vehicle controller 50, the inverter 20 or the energy management module (52, 152) is configured to determine an observed state of charge (SOC) of the energy storage system 22 with respect to a target SOC to determine whether to provide electrical energy to charge or discharge the energy storage system 22, or to make the energy storage system 22 enabled or disabled (e.g., eligible or available) for a charging state or a discharging state. For example, the vehicle controller 50, inverter 20 or energy management module (52, 152) may charge the energy storage system 22 by applying primary rotational energy of the engine 10 to the generator (16, 116) and directing or diverting at least a portion of the generated electrical energy into the energy storage system 22 via the dual inverter 20. Conversely, the vehicle controller 50, inverter 20 or energy management module (52, 152) may discharge the energy storage system 22 by withdrawing some electrical energy from the energy storage system 22 via the dual inverter 20 to power the motor (28, 128) for one or more sampling intervals Further, the vehicle controller 50 may introduce a switched electrical load at the DC terminals 26 or at any AC terminals (18, 24) to discharge the energy storage system 22.

Under a third mode, the vehicle controller 50, inverter 20 or energy management module (52, 152) is configured to control a DC bus voltage at the DC terminals 26 of the dual inverter 20 pursuant to a voltage control mode.

Under a fourth mode, the vehicle controller 50, inverter 20 or energy management module (52, 152) is configured to generate one or more changes to commanded generator power data ($P^*_{Gen,Final}$), commanded motor data ($T^*_{mot}$), and commanded SOC (SOC*) data by a control algorithm to shave/reduce peak load for any sampling interval by drawing stored energy from an energy storage system (22, 122, 222) for the sampling interval or next sampling interval or a window following the sampling interval based on: (a) an engine power capability or maximum engine power of the internal combustion engine 10 at a commanded speed commanded by the vehicle controller 50, where engine power capability (e.g., maximum engine power or peak engine power) expressed as a torque versus engine speed curve, look-up table, or equations, (b) a commanded torque or commanded speed of the motor (28, 128) that is commanded by the vehicle controller 50; (c) a present total vehicle load, where torque sensors and/or rotor speed sensors are associated with any of the following: (1) the crankshaft of the internal combustion engine 10, (2) the rotor of the motor (28, 128), and (3) the hydraulic load 114 or hydraulic pump of the hydraulic load 114 to operably communicate to the vehicle controller 50 (e.g., via the vehicle data bus (e.g., controller area network (CAN) data bus; (d) a present total vehicle load where by hydraulic flow rate sensors (e.g., fluid volume pumped/time) or hydraulic pressure sensors (e.g., boom lift pressure sensor) are associated with the hydraulic implement are associated with the hydraulic load 144 or hydraulic pump of the hydraulic load; (e) a commanded power of the generator 116 (e.g., based on a maximum generator power limit and a minimum generator power limit), and (e) a state of charge (SOC) of an energy storage system 22 comprising an observed SOC and a commanded SOC of the energy storage system 22.

The block diagram of FIG. 2B is similar to the block diagram of FIG. 2A, except the block diagram of FIG. 2B further comprises the transmission controller 66, a torque sensor 67, and a rotor speed sensor 68, which can be coupled to a vehicle data bus 201 or a vehicle communications network (e.g., wireless local network) for communication with the vehicle controller 50, the dual inverter 30, or both. The blocks for transmission controller 66, torque sensor 67 and rotor speed sensor 68 are show in dashed lines to indicate that the components are optional, and can be omitted in other embodiments. Further, FIG. 2B comprises a first electrohydraulic cylinder 108 and a second electrohydraulic cylinder 110 that are coupled with hydraulic lines 109 to the first vehicle load 14, which comprises a hydraulic system or a hydraulic pump.

The transmission controller 66 can generate control data 54 messages or control signals to control one or more modes of operation of the shaft assembly 12, such as gearbox control, gear selection, gear ratio selection, and clutch control. For example, in one embodiment as illustrated in FIG. 2B, the transmission controller 66 can communicate control messages to the shaft assembly 12, where the shaft assembly 12 comprises a gearbox with one or more clutches (e.g., electromechanical clutches, mechanical clutches or hydraulic clutches) that can selectively enable or disable one or more of the following: (a) a first rotational coupling mode between the input shaft 102 and the first output shaft 104, (b) a second rotational coupling mode between the input shaft 102 and the second output shaft 106, (c) a third rotational coupling mode between the input shaft 102 and both the first output shaft 104 and the second output shaft 106, and (d) a fourth rotational coupling between the first output shaft 104 and the second output shaft 106. In a conventional operational mode, the shaft assembly 12 or gearbox operates in the third rotational coupling mode. To distinguish the rotational coupling modes from other modes disclosed ins this document, which are associated with the energy management controller, the rotational coupling modes may be referred to as rotational coupling selections.

In FIG. 2B, if the internal combustion engine 10 cannot provide sufficient primary rotational energy to cover (e.g., meet or exceed) the total vehicle load, the vehicle controller 50, either alone or in cooperation with the transmission controller 66, may operate in accordance with several alternate processes that may be implemented together or separately. Under a first alternate process, the first electric machine 16 (or generator 116) comprises an electric machine that can be operated in a motoring mode, where the shaft assembly 12 or gearbox is operable with the third operational coupling to assist the primary rotational energy provided by the internal combustion engine 10. Under a second alternate process, the first electric machine 16 (or generator 116) comprises an electric machine that can be operated in a generating mode, where the shaft assembly 12 or gearbox is operable with the second operational coupling to use the primary rotational energy provided by the internal combustion engine 10. Under a third alternate process, the generator 116 (first electric machine 16) comprises an electric machine that can be operated in a motoring mode, where the shaft assembly 12 or gearbox is operable with the fourth operational coupling mode, without the first, second or third rotational coupling modes to provide auxiliary rotational energy to the first vehicle load (14, 114) in lieu of the primary rotational energy otherwise provided by the internal combustion engine 10.

As illustrated in FIG. 2B, a torque sensor 67 and rotor shaft speed sensor 68 are associated with the first vehicle load 14 in accordance with various examples, which may be applied separately or cumulatively. In a first example, the first vehicle load 14 may comprise a hydraulic load or a hydraulic system load, a hydraulic pump load, or a hydraulic motor load that is associated with a shaft or rotor of the hydraulic pump, or hydraulic motor. In a second example, the torque sensor 67 and the rotor shaft speed sensor 68 are configured to measure torque and rotor shaft speed of a hydraulic pump associated with the hydraulic load. In a third example, the torque sensor 67 and the rotor shaft speed sensor 68 are configured to measure torque and rotor shaft speed of a hydraulic motor associated with the hydraulic load. In a fourth example, the rotor shaft speed sensor 68 comprises a magnet secured to the rotor and a magnetic field sensor that senses a magnetic field or change in the magnetic field of the magnet, such as a change in the magnetic field associated with rotation, velocity or acceleration measurements of the rotor. In a fifth example, the first vehicle load 14 may comprise a first load on the shaft or rotor of an electric machine that drives a hydraulic pump or that is driven by the hydraulic motor. In a sixth example, the first vehicle load 14 comprises an actuator, such as a linear actuator or an electric motor associated with a screw mechanism for actuating or moving an arm, a boom, or a tool (e.g., bucket or fork) associated with a loader, excavator, or another work vehicle. In a seventh example, the torque sensor 67 and the rotor shaft speed sensor 68 are configured to measure torque and rotor shaft speed of a hydraulic pump associated with the hydraulic load, where the measured torque and rotor shaft speed are inputted into a hydraulic observer (e.g., in the dual inverter 20, EMCM 52, or the vehicle controller 50) that models the hydraulic performance in an electric machine domain, such as the direct-axis current and quadrature-axis current domain, or in the stationary reference frame (4), to estimate the hydraulic pump usage in terms of estimated hydraulic pressure and hydraulic flow.

In FIG. 2B, each sensor, such as the torque sensor 67 or rotor speed sensor 68, may comprise an integral analog-to-digital converter or each sensor may be coupled to a separate analog-to-digital converter and a communications interface for interfacing with the vehicle data bus 201 (e.g., Controller Area Network (CAN) data bus) and communicating one or more sensor readings with any controllers (50, 64, 66, 20) or other network elements on the vehicle data bus 201.

In an alternate embodiment of FIG. 2B, each sensor may comprise one or more of the following: a torque sensor 67, a speed sensor 68, a magnetic field sensor coupled with one or more magnets, a shaft speed sensor, a shaft speed encoder, a resolver, or a sensorless estimator of shaft speed, velocity, acceleration or torque incorporated into an inverter for controlling an electric machine.

Figure 2C:
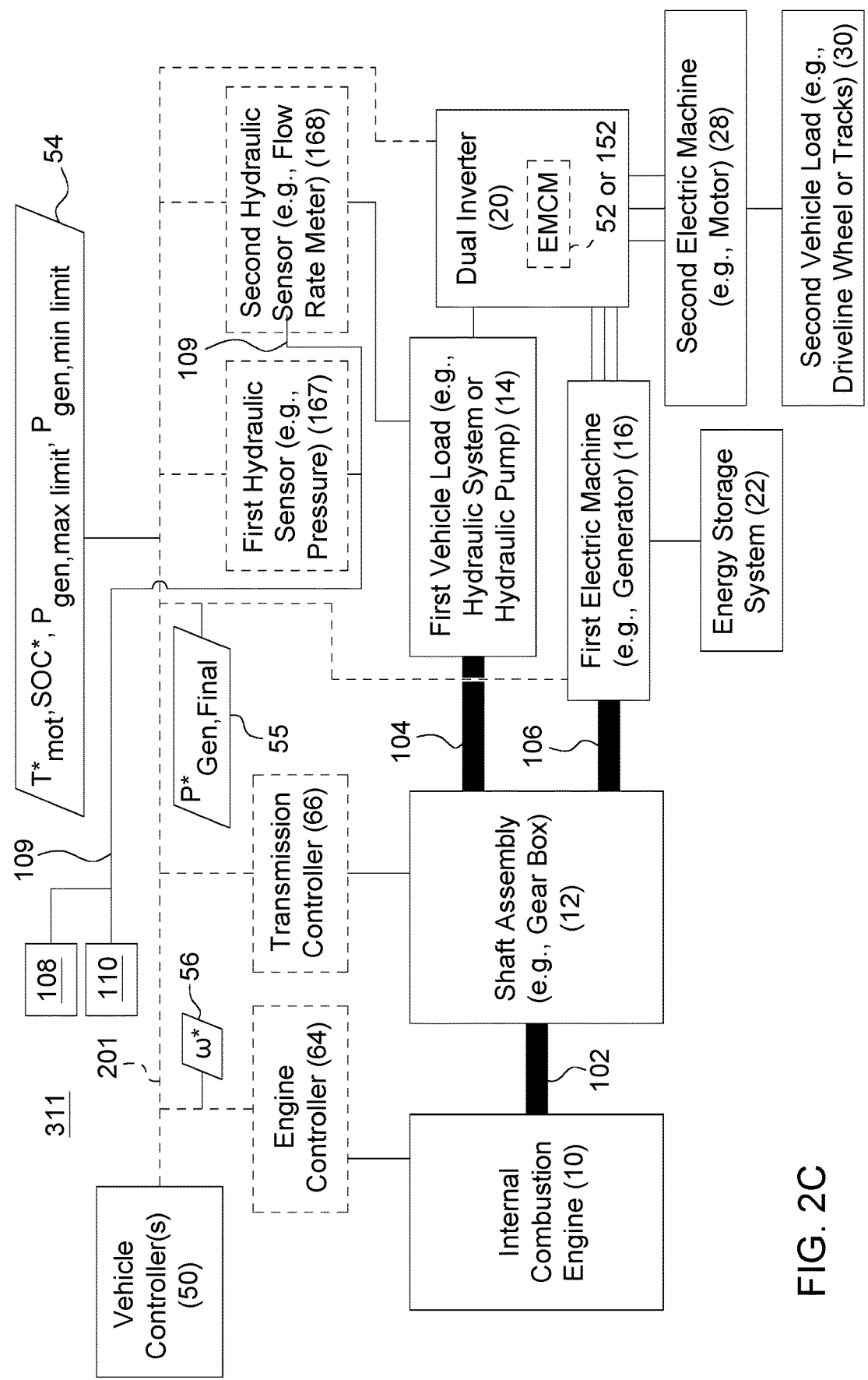
FIG. 2C is a block diagram of still another embodiment of an energy management system for a hybrid electric ground vehicle, such as a loader, with a transmission controller and hydraulic sensors.

As illustrated in FIG. 2A through FIG. 2C, inclusive, the dual inverter 20 already has access to commanded torque and observed rotor speed for the second vehicle load 30 (traction load) on the second electric machine 28 (e.g., motor 128). Accordingly, a torque sensor or shaft speed sensor at the electric second machine 28 for the second load are optional. Like reference numbers in FIG. 1A through FIG. 2C indicate like elements.

The block diagram of FIG. 2C is similar to the block diagram of FIG. 2B, except the block diagram of FIG. 2C replaces the torque sensor 67 and rotor speed sensor 68 with a first hydraulic sensor 167 and second hydraulic sensor 167. The blocks for engine controller 64, transmission controller 66, first hydraulic sensor 167, and second hydraulic sensor 168 are shown in dashed lines to indicate that the components are optional, and can be omitted in other embodiments.

In one configuration, in FIG. 2C the first vehicle load 14 may comprise a hydraulic load, such as an electrohydraulic actuator, a hydraulic motor, a hydraulic pump, a hydraulic accumulator, hydraulic lines for carrying hydraulic fluid between hydraulic devices, hydraulic couplings or switches, or another hydraulic device for controlling movement of the implement, such as an arm, a boom, or a tool (e.g., bucket or fork) of a work vehicle. In FIG. 2C, a first hydraulic sensor 167 is configured to measure one or more characteristics or parameters of the hydraulic implement load, where the first hydraulic sensor 167 is associated with the hydraulic device (e.g., electrohydraulic actuator, 108, 110, 804). A second hydraulic sensor 168 is configured to measure one or more characteristics or parameters of the hydraulic implement load, where the second hydraulic sensor 168 is associated with the hydraulic device (e.g., electrohydraulic actuator). For example, the measured parameters may include hydraulic pressure, hydraulic flow, or both.

In one configuration, the first hydraulic sensor 167 comprises a hydraulic pressure transducer, a piezoresistive sensor, a piezoelectric sensor, or another device for measuring hydraulic pressure of hydraulic fluid associated with a hydraulic device. The first hydraulic sensor 167 may comprise an integral analog-to-digital converter or the first hydraulic sensor may be coupled to a separate analog-to-digital converter and a communications interface for interfacing with the vehicle data bus 201 (e.g., Controller Area Network (CAN) data bus) and communicating one or more sensor readings with any controllers (50, 64, 66, 20) or other network elements on the vehicle data bus.

In one configuration, the second hydraulic sensor 168 comprises a flow sensor, a gear-based flow sensor, a turbine-based flow sensor, or another flow meter for measuring fluid displacement or flow (e.g., in pumped or displaced liquid volume per unit time). The second hydraulic sensor 168 may comprise an integral analog-to-digital converter or the second hydraulic sensor may be coupled to a separate analog-to-digital converter and a communications interface for interfacing with the vehicle data bus (e.g., Controller Area Network (CAN) data bus) and communicating one or more sensor readings with any controllers (50, 64, 66, 20) or other network elements on the vehicle data bus.

In on embodiment, the first hydraulic sensor 167 and second hydraulic sensor 168 are associated with the discharge port of a hydraulic pump, an input port or output port of a hydraulic motor, a hydraulic actuator, an electrohydraulic cylinder (e.g., 108, 110, 804) of an implement of loader, excavator, or other work vehicle.

In an alternate configuration, each of the first hydraulic sensor 167 and second hydraulic sensor 168 generally comprises a sensor selected from the group consisting of a hydraulic flow sensor, a hydraulic pressure sensor, a hydraulic pump sensor, a hydraulic cylinder position sensor (e.g., for measuring linear displacement of a cylinder shaft), and a boom lift electrohydraulic pressure sensor.

Figure 2D:
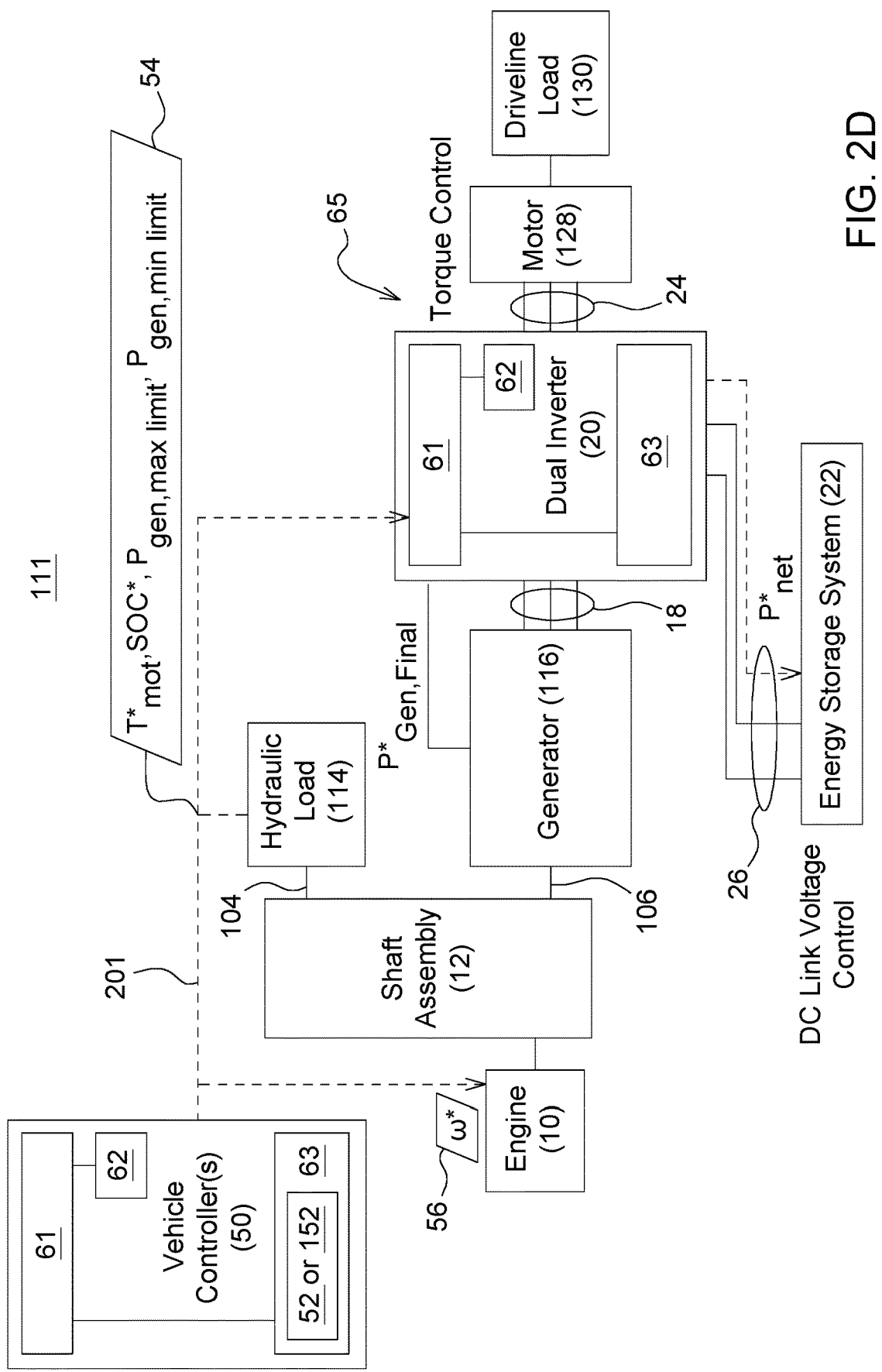
FIG. 2D is a block diagram of an alternate embodiment of an energy management system for a hybrid electric ground vehicle, such as a loader, with a transmission controller and hydraulic sensors.

The block diagram of FIG. 2D is similar to the block diagram of FIG. 2A, except the block diagram of FIG. 2D discloses an alternate embodiment in which the vehicle controller 50 comprises the energy management module (52, 152). Further the vehicle controller comprises an electronic data processor 62 and a data storage device 63 that are coupled to a data bus 61 for supporting communication between the electronic data processor 62 and the data storage device 63, among other things. As illustrated, the energy management module (52, 152) is stored in the data storage device 63 for execution by the electronic data processor 62 in accordance with the software, software instructions and data files associated with the energy management module (52, 152).

Figure 3:
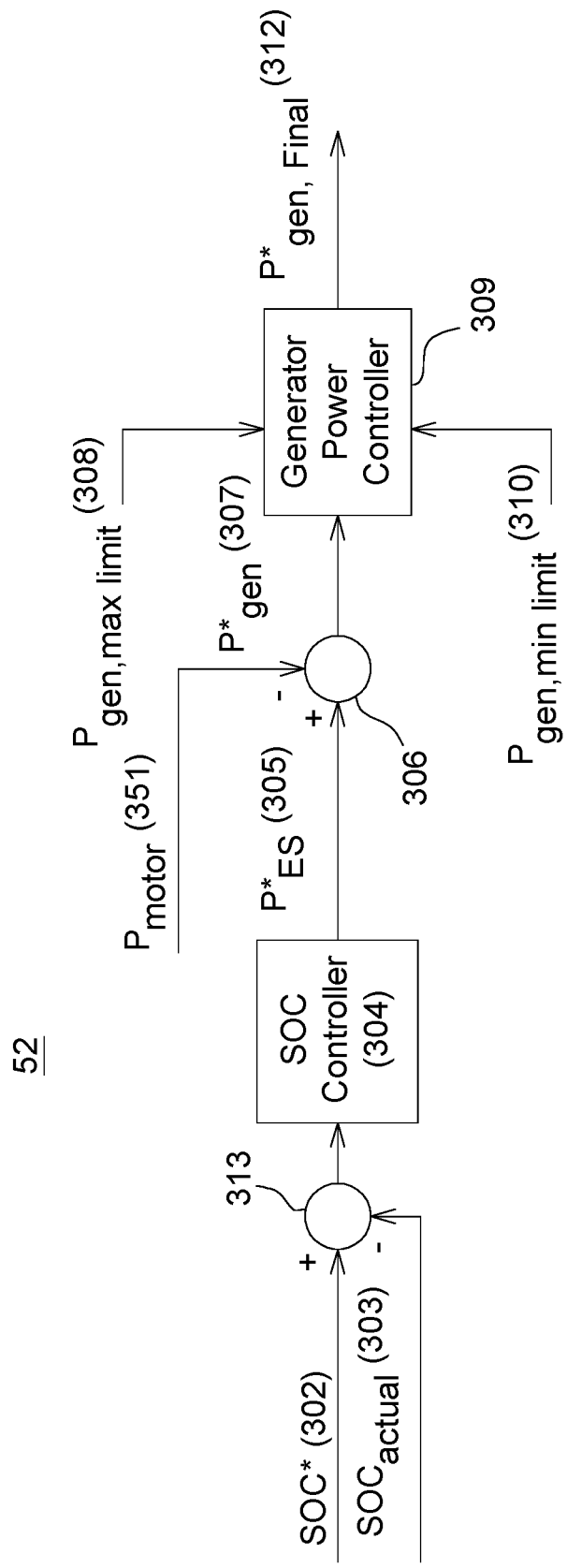
FIG. 3 is a block diagram of one embodiment of an energy management control module of the energy management system.

FIG. 3 is a block diagram of one embodiment of an energy management control module 52 of the energy management system (11, 111, 211, 311).

The energy management control module 52 estimates an energy storage command energy storage command 305 ($P^*_{ES}$) based on a summer 313 that determines a difference or error between state-of-charge (SOC) data (302, 303) and a SOC controller 304 that processes the difference or error in SOC data for a corresponding sampling interval. In one embodiment, for example, the energy management control module 52 comprises a SOC controller 304 that determines the energy storage command 305 ($P^*_{ES}$) based upon the difference or error between the commanded state-of-charge 302 (SOC*) of the energy storage system 22 and the observed state-of-charge 303 ($SOC_{actual}$) of the energy storage system 22. The observed state of charge 303 may be referred to as the actual state of charge for any sampling interval.

The energy management control module 52 receives or obtains motor power load data 351 ($P_{motor}$) on the motor (28, 128) for a corresponding sampling interval. The dual inverter 20 provides the motor power load data ($P_{motor}$) or motor power consumption comprises a product of commanded torque ($T^*_{mot}$) and a corresponding observed rotor speed ($\omega_{mot}$) for the motor (28, 128). The vehicle controller 50 may provide the commanded torque that may depend upon operator commands or operating conditions, for example. The inverter 20 may estimates rotor speed of the motor (28, 128) by an encoder, resolver or sensorless rotor speed estimation techniques associated with measurement of the alternating current output signals of the inverter that are coupled to the motor (28, 128) to control the motor (28, 128).

The energy management control module 52 or a summer 306 determines or outputs an initial generator power command, which is designated as $P^*_{gen}$ based on the difference or error between the motor power load data 351 ($P_{motor}$) for a sampling interval and energy storage command 305 ($P^*_{ES}$) for the sampling interval. The energy storage command 305 ($P^*_{ES}$) for the sampling interval indicates if the energy storage device 36 or energy storage system 22 needs to be charged, discharge, or neither for the sampling interval. Accordingly, the energy storage command 305 ($P^*_{ES}$) represents an appropriate power command to meet regulate the energy storage state-of-charge of the energy storage device 36 or energy storage system 22.

The energy management control module 52 or the generator 116 command module determines or outputs a final generator 116 power command, which is designated as $P^*_{gen,Final}$, based on the initial-generator power command 307 ($P^*_{gen}$), the maximum generator power limit 310 ($P_{gen,maxlimit}$) and the minimum generator power limit ($P_{gen,minlimit}$). The final generator power command 312 ($P^*_{gen,Final}$) is derived from the power consumption of the engine 10 that is provided by vehicle controller 50, which has knowledge of the maximum engine power capability and the hydraulic loads (14, 114) that form the total vehicle load on the internal combustion engine 10.

If the engine power of the internal combustion engine 10 can handle the total vehicle load for the sampling interval, the generator power controller 309 may generate or send the final generator power command 312 ($P^*_{gen,Final}$) that is within a range between the minimum generator power limit 310 and the maximum generator power limit 308 for the sampling interval. However, if the maximum engine power (or then-available engine power for sampling interval) of the internal combustion engine 10 is not capable to handle the total vehicle load for the sampling interval, the generator power controller 309 may generate or send the final generator power command 312 that is consistent with, biased toward or approaching the minimum generator power limit 310 for the sampling interval to supplement engine power during times of peak loads by drawing electrical energy from the energy storage system 22, rather than the generator 116 to power the motor 128.

Figure 4:
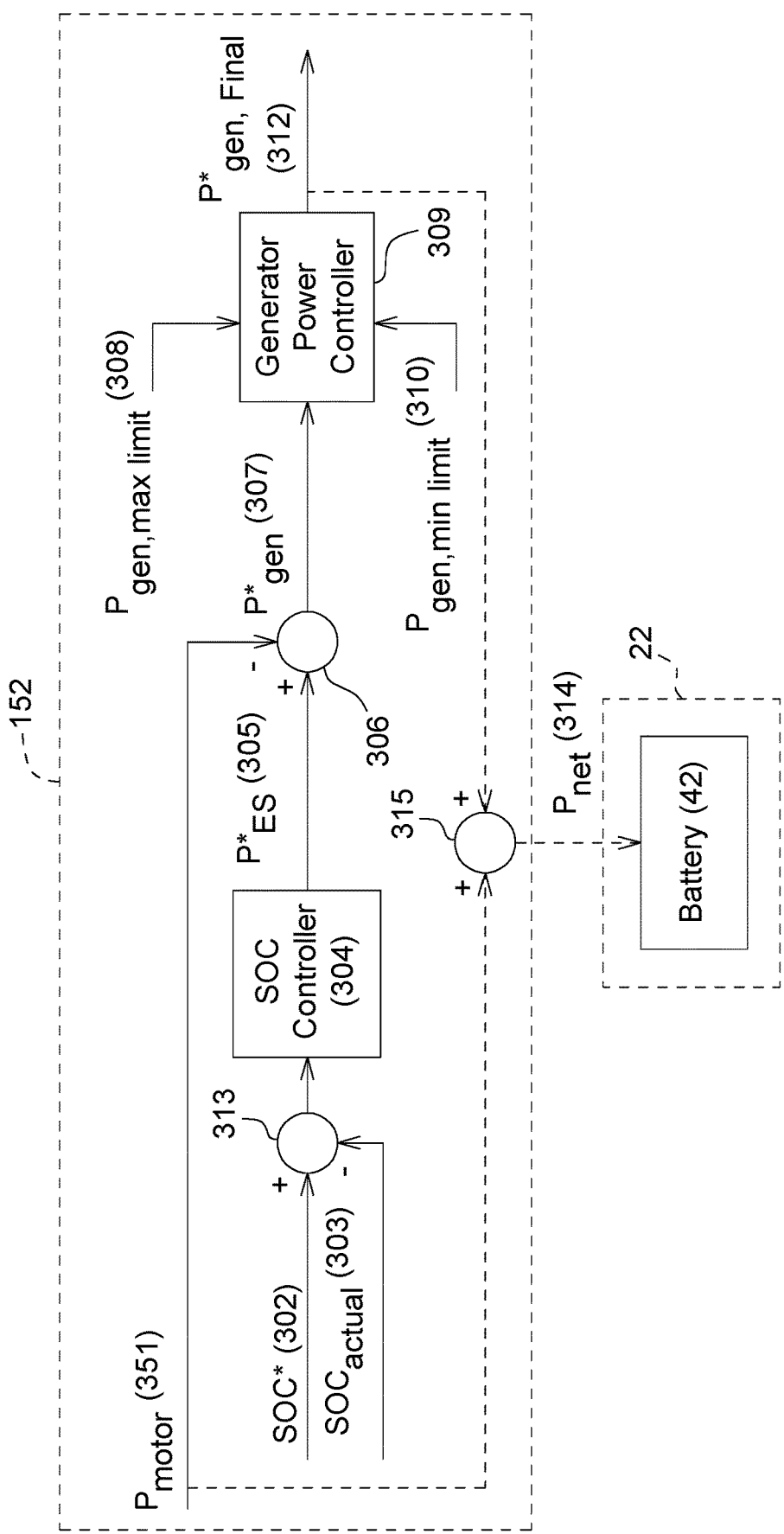
FIG. 4 is a block diagram of one embodiment of an energy management control module of the energy management system in conjunction with a battery (e.g., high voltage battery).

FIG. 4 is a block diagram of one embodiment of an energy management module 152 of the energy management system (11, 111, 211, 311) in conjunction with a battery 42 (e.g., high voltage battery). Like reference numbers in FIG. 3 and FIG. 4 indicate like features or elements. The energy management control module 152 of FIG. 4 is similar to the energy management control module 52 of FIG. 3, except the energy management control module 152 further comprises a summer 315 that provides a sum (or inherent difference of net power, $P_{net}$) of the motor power load data 351 ($P_{motor}$) and the final generator power command 312, which is designated as $P^*_{gen,Final}$, where the motor power load data inherently has a negative sign associated with it relative to the final generator power command 312. Like reference numbers in FIG. 3 and FIG. 4 indicate like elements.

In FIG. 4, the energy management control module 152 is coupled to a battery 42, such as a high voltage battery 42. In FIG. 4 for a high voltage battery 42 directly tied to DC bus (e.g., DC terminals 26) associated with the dual inverter 20, the battery 42 is inherently a voltage source and maintains a relatively stiff voltage. The battery 42 inherently sources or sinks the difference in motor power of the motor 116 and the generator power of the generator 116 in the electric driveline system. The energy management control module 152 or the dual inverter 20 can provide power or energy from the rotating generator 116 to charge the battery 42 or can discharge the battery 42 into a load, such as the motor 128 or generator 116 operating in the motoring mode. In FIG. 4, the energy management control module 152 or dual inverter 120 does not need to generate or send a commanded net power storage value 314 ($P_{net}$) to the battery 42 because the battery characteristics of the battery 42 inherently sources or sinks (e.g., balances) the difference of the net power ($P_{net}$) in motor load power of the motor 128 and generator power of the generator 116 (e.g., to achieve a proper current flow to maintain a target SOC or battery health indicator).

Figure 5:
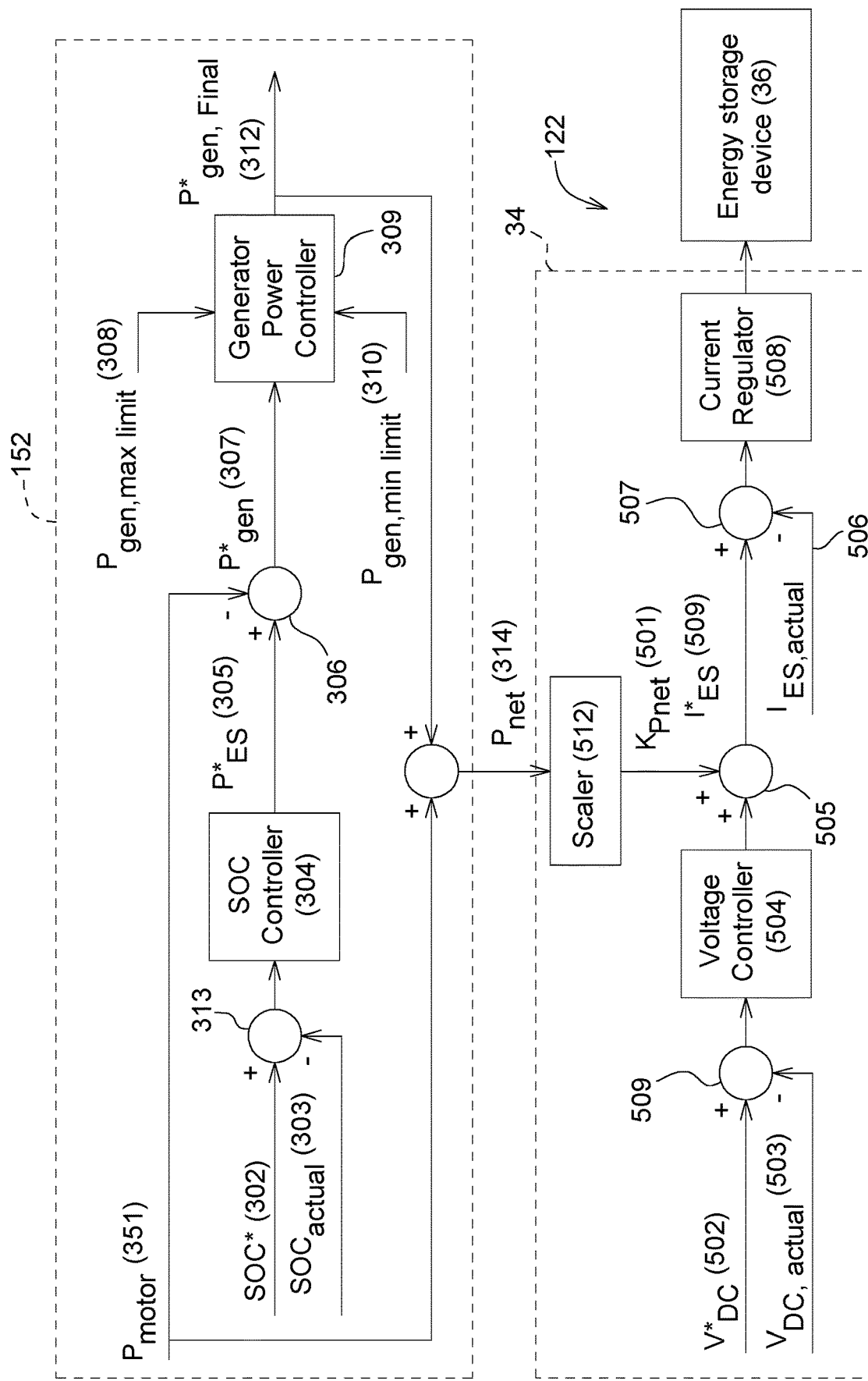
FIG. 5 is a block diagram of one embodiment of an energy management control module of the energy management system in conjunction with a direct-current-to-direct-current converter coupled to an energy storage device.

FIG. 5 is a block diagram of one embodiment of an energy management module 152 of the energy management system in conjunction with a direct-current-to-direct-current converter 34 coupled to an energy storage device 36. The energy management control module 152 of FIG. 5 is similar to the energy management control module 152 of FIG. 4. Like reference numbers in FIG. 4 and FIG. 5 indicate like features or elements.

In FIG. 5, the energy storage device 36 may comprise a battery that operates at a lower direct current (DC) voltage than the DC voltage of the DC bus (e.g., at DC terminals 26). The dual inverter 20 is coupled to the DC/DC converter 34 of the energy storage system 122. In one embodiment, DC/DC converter 34 receives a net power command 314 ($P_{net}$) from the dual inverter 20 or energy management control module 152. The net power command 314 ($P_{net}$) is the nominal power the energy storage system 22 (e.g., DC/DC converter 34 and the battery 42 collectively) needs to source or sink in order to maintain a constant DC bus voltage (e.g., at the DC terminals 26) between the dual inverter 120 and the DC/DC converter 34.

In one embodiment, the DC/DC converter 34 comprises a voltage controller 504 that receives a difference or error between a commanded DC voltage 502 ($V^*_{DC}$) and an observed DC voltage 503 ($V_{DC,actual}$) of the DC voltage bus (e.g., at DC terminals 26) at the inverter 20. The summer 509 determines the difference or error between a commanded DC voltage 502 ($V^*_{DC}$) and an observed DC voltage 503 ($V_{DC,actual}$). The energy management control module 152 provides the net power command 314 ($P_{net}$) to the DC/DC converter 34.

The DC/DC converter 34 comprises an amplifier or scaler 512 to derive or scale a constant power factor 501, $K_{Pnet}$, from the provided the net power command ($P_{net}$). The constant power factor 501 $K_{Pnet}$ is applied to a summer 505. The constant power factor 501 $K_{Pnet}$ is summed with the voltage controller output of voltage controller 504 to yield a commanded current 509 ($I^*_{ES}$). At a summer 507, a difference or error is determined between the commanded current 509 ($I^*_{ES}$) and the observed current 506 ($I_{ES,actual}$). The current regulator 508 determines, regulates or limits the amount to be charged or discharged from the energy storage device 36, such as a battery with a lower voltage battery than the DC bus voltage at DC terminals 26 of the dual inverter 20.

In one embodiment, the DC/DC converter 34 further comprises an outer voltage control loop to compensate for errors in regulation of the DC bus voltage or the DC link between the dual inverter 20 and the DC/DC converter 34. For example, the outer voltage control loop of the DC/DC converter 34 can reduce errors in the $P_{net}$ value 314 and delays from the time the $P_{net}$ value 314 is generated by the energy management controller 152 to the time the $P_{net}$ value 314 is actually applied by the energy storage system 122 or the energy storage device 36 (e.g., battery). The energy management control module 152 facilitates robust DC link voltage control by having the energy storage system 122 operate in a voltage control mode and potentially sending a net power command ($P^*_{net}$), instead of the estimated net power ($P_{net}$) for one or more overridden sampling intervals that are overridden by the above outer voltage control loop, to the energy storage system 122 (e.g., DC/DC converter 34 of FIG. 5) from the energy management control module 152 or the dual inverter 120.

Figure 6:
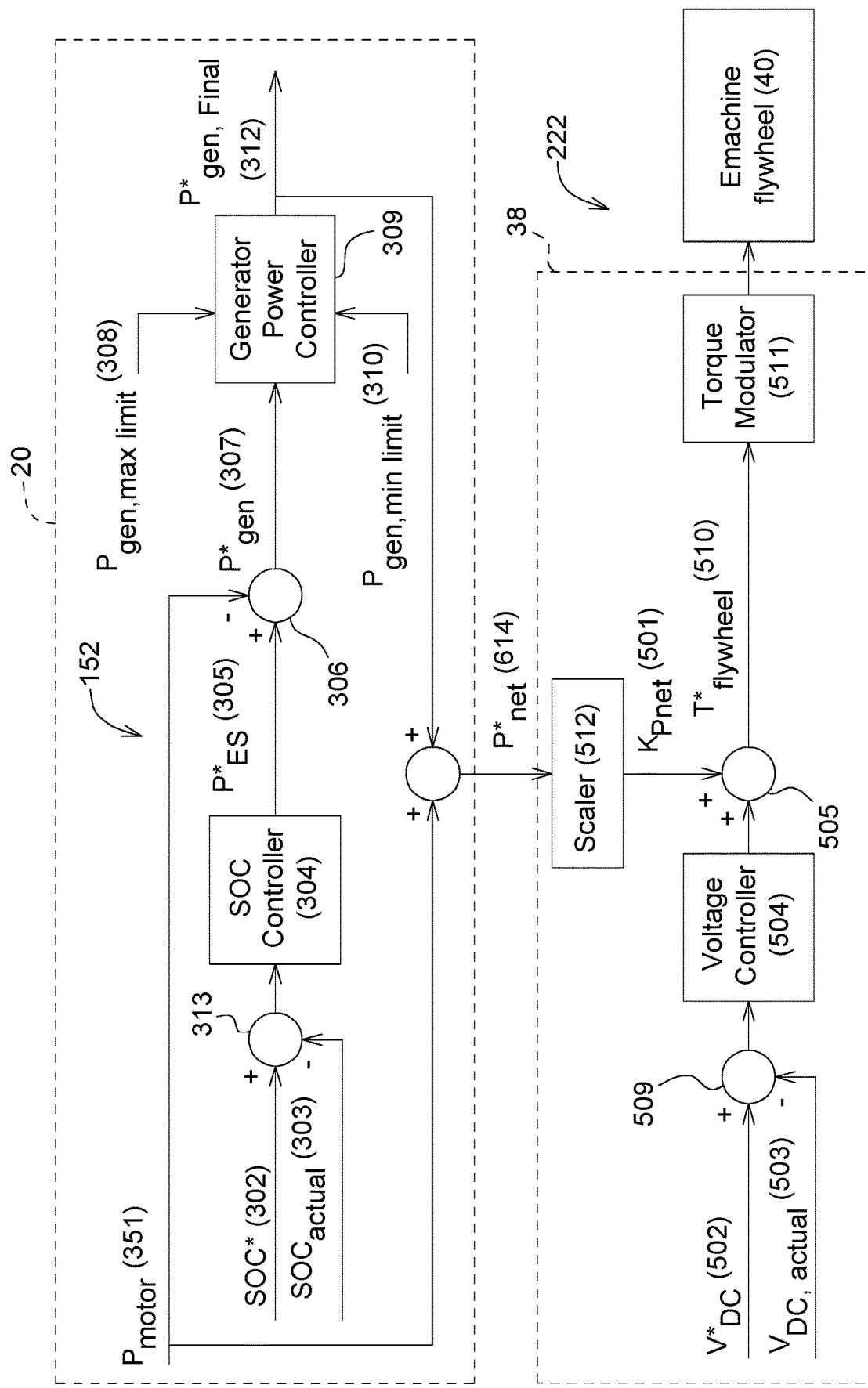
FIG. 6 is a block diagram of one embodiment of an energy management module of the energy management system in conjunction with an inverter coupled to an electric machine flywheel.

FIG. 6 is a block diagram of one embodiment of an energy management module 152 of the energy management system (11, 111, 211, 311) in conjunction with an additional inverter 38 coupled to an electric machine flywheel 40 via a flywheel inverter controller. The energy management control module 152 of FIG. 6 is similar to the energy management control module 152 of FIG. 4. Like reference numbers in FIG. 4 and FIG. 6 indicate like elements or features.

In FIG. 6, the energy storage device of the energy storage system 222 may comprise an electric machine flywheel 40. In one embodiment, the inverter 38 receives a commanded net power 614 ($P^*_{net}$) from the dual inverter 20 or energy management control module 152. The commanded net power 614 ($P^*_{net}$) is the nominal power the energy storage system 222 (e.g., flywheel inverter 38 and the electric flywheel machine 40) needs to source or sink in order to maintain a constant DC bus voltage at the DC terminals 26 between the dual inverter 20 and the flywheel inverter 38.

In one embodiment, the flywheel inverter 38 further comprises an outer voltage control loop to compensate for errors in regulation of the DC bus voltage at the DC bus terminals 26 between the dual inverter 20 and the flywheel inverter 38. For example, the outer voltage control loop of the flywheel inverter 38 can reduce errors in the commanded net power 614, $P^*_{net}$ value, and delays from the time the commanded net power 614, $P^*_{net}$ value, is estimated or generated by the energy management controller 152 to the time is actually applied by the energy storage system 222. The energy management control module 152 facilitates robust DC link voltage control by having the energy storage system 222 operate in a voltage control mode and potentially sending a fast commanded net power command ($P^*_{net,fast}$), instead of the estimated, commanded net power 614 ($P^*_{net}$) for one or more overridden sampling intervals that are overridden by the above outer voltage control loop, to the energy storage system 222 (e.g., flywheel inverter 38 of FIG. 6) from the energy management control module 152 or the dual inverter 20.

In one embodiment, the flywheel inverter 38 comprises a voltage controller 504 that receives a difference or error between a commanded DC voltage 502 ($V^*_{DC}$) and an observed DC voltage 503 ($V_{DC,actual}$) of the DC voltage bus (e.g., at DC terminals 26) at the dual inverter 20. The summer 509 determines the difference or error between a commanded DC voltage 502 ($V^*_{DC}$) and an observed DC voltage 503 ($V_{DC,actual}$). The energy management control module 152 provides the net power command 614 ($P^*_{net}$) to the flywheel inverter 38.

The energy management control module 152 provides the commanded net power command 614 ($P^*_{net}$). The flywheel inverter 38 derives or scales a constant power factor 501 $K_{Pnet}$, from the provided commanded net power 614 ($P^*_{net}$). The constant power factor 501 $K_{Pnet}$ is summed at summer 505 with the output voltage of the voltage controller 504 to yield a flywheel torque commend 510 ($T^*_{flywheel}$). A torque modulator 511 controls, regulates, modulates, or limits the torque and/or rotational speed of the electric machine flywheel 40 to manage energy charging and discharging associated with the electric machine flywheel 40, where the flywheel stores energy in proportion to its rotational speed and mass. For example, the flywheel inverter 38 or torque modulator 511 may control the electric machine flywheel 40 in a motoring mode (e.g., for increased torque or increased rotor speed), a generating mode (e.g., braking mode for reduced torque or reduced rotor speed), or both.

Figure 7:
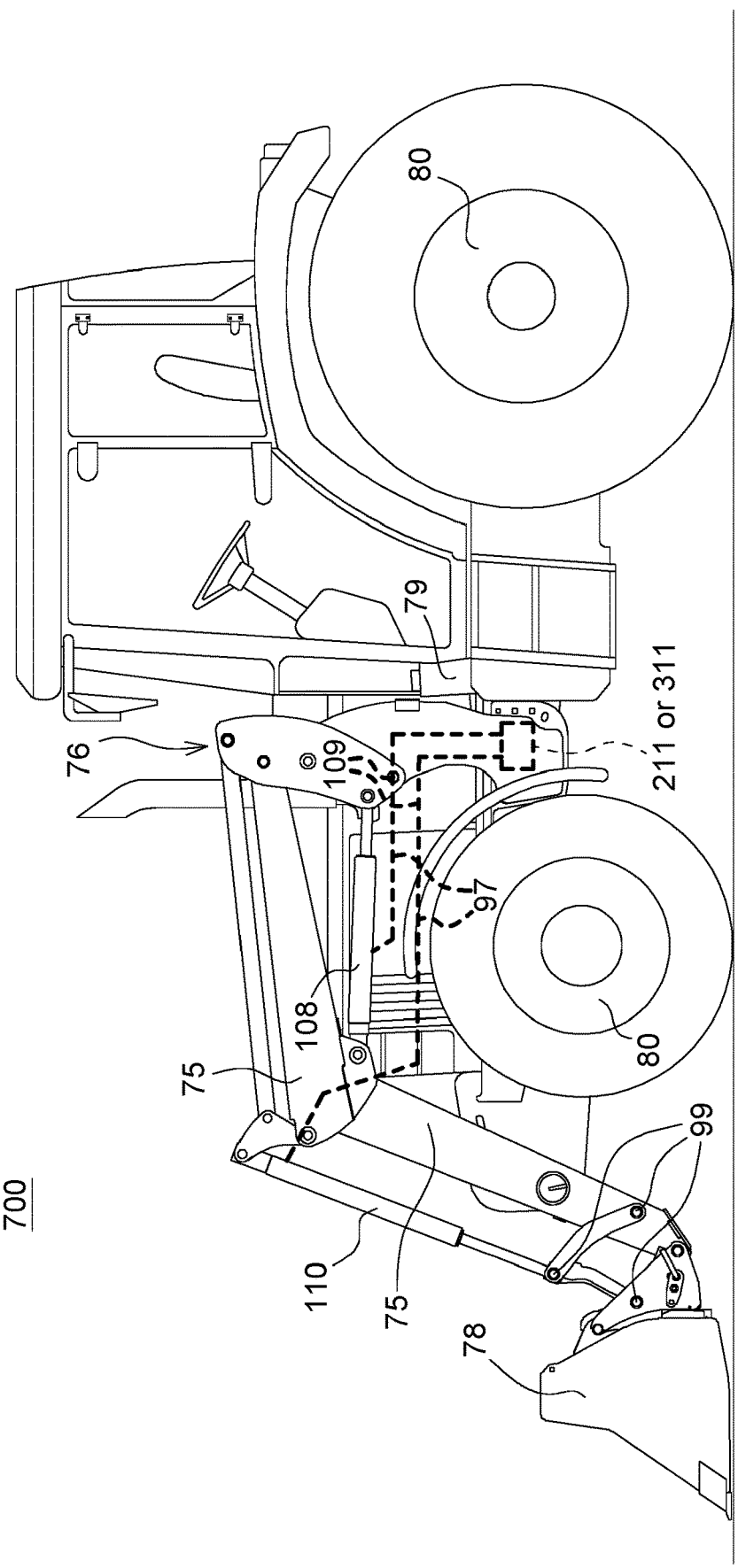
FIG. 7 is a side view of one embodiment of a loader that may incorporate the energy management system.

FIG. 7 is a side view of one embodiment loader 700 that may incorporate the energy management system (211 or 311). The loader 700 comprises a framework 79 that supports a boom or an arm assembly 75 (e.g., of two parallel arms connected by a brace) that can pivot about a first pivot point 76 via one or more actuators 108 (e.g., first electrohydraulic cylinder or pair of first electrohydraulic cylinders), and a tool 78 (e.g., bucket) that is attached to the arm assembly 75 at a second pivot point 99 for rotating the tool (e.g., rotating the bucket upward or downward) via a second actuator 110 (e.g., second electrohydraulic cylinder). In one embodiment, a hydraulic system of the vehicle comprises the first actuator 108 and the second actuator 110, that are coupled via hydraulic lines 79 to a hydraulic pump or accumulator, with a first hydraulic sensor and a second hydraulic sensor associated with the output hydraulic lines of the hydraulic pump or accumulator. For example, the energy management system (211 or 311) interfaces with the hydraulic system, consistent with the energy management system of FIG. 2B or FIG. 2C.

The loader 700 or vehicle may be configured with various alternate embodiments, which may be applied separately or cumulatively. In a first alternate embodiment, a hydraulic pressure sensor, a flow sensor, a combined hydraulic pressure sensor and flow sensor, or a hydraulic load sensor may be coupled to hydraulic lines associated with any of the following: a first electrohydraulic cylinder, a second electrohydraulic cylinder and a third electrohydraulic cylinder.

In second alternate embodiment, a torque sensor and shaft sensor may be associated with the rotor shaft of the hydraulic pump.

In third alternate embodiment, electronic or magnetic cylinder position sensors may be associated with the position, length or extension of the shaft from one or more electrohydraulic cylinders.

Figure 8:
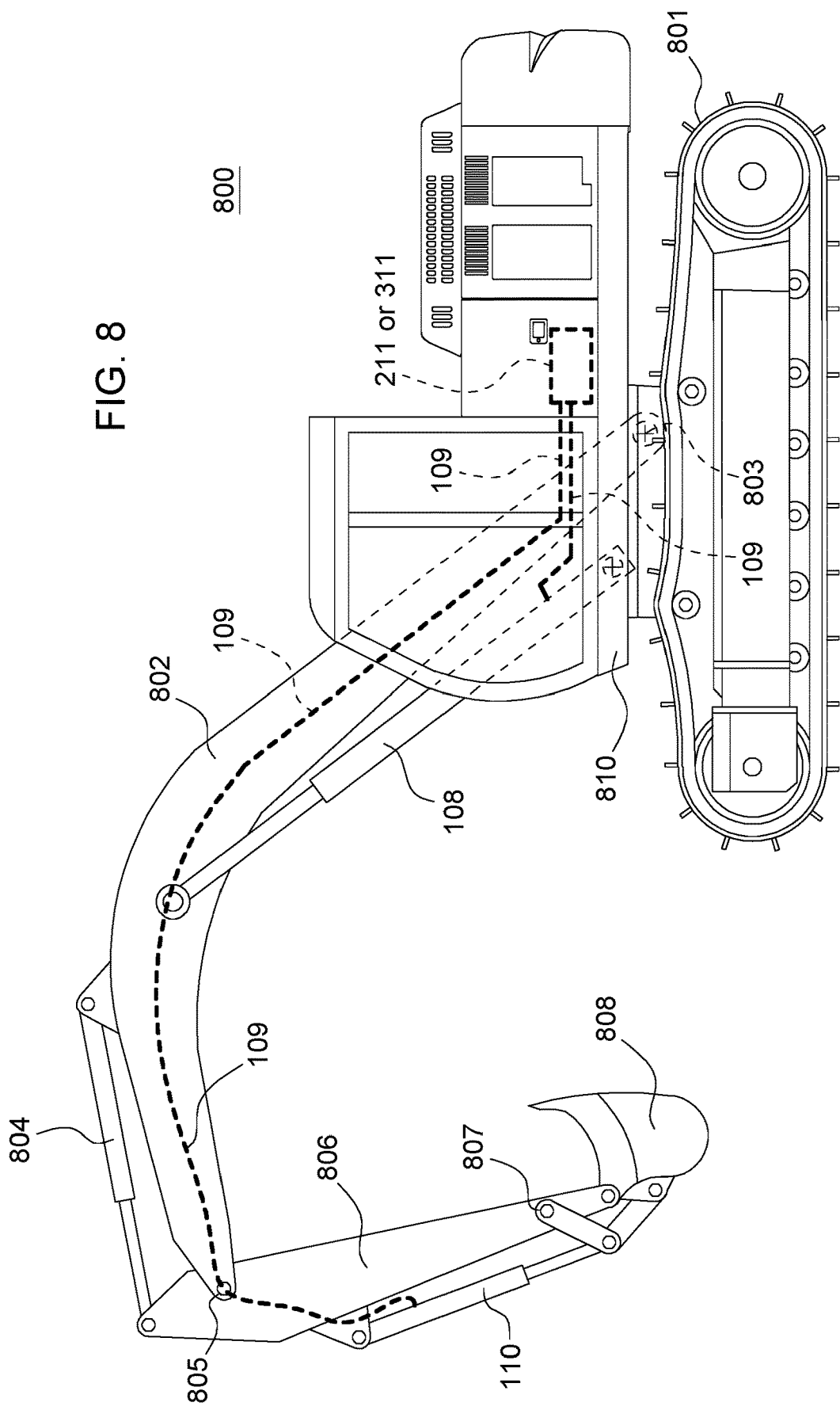
FIG. 8 is a side view of one embodiment of excavator that may incorporate the energy management system.

In an alternate embodiment, in FIG. 8 the vehicle is configured as an excavator 800 that comprises a framework 810 that supports a boom 802 that can pivot about a first pivot point 803 via a first actuator 108 (e.g., first electrohydraulic cylinder), an arm 806 that is rotatably attached to the boom 802 (e.g., at a second pivot point 805) that can pivot about a second pivot point 805 via second actuator 804 (e.g., second electrohydraulic cylinder) and a tool 808 (e.g., bucket) that is rotatably attached to the arm 806 at a third pivot point 807 for rotating the tool 808 (e.g., rotating the bucket upward or downward) via third actuator 110 (e.g., third electrohydraulic cylinder).

In the alternate embodiment of the excavator, a hydraulic system of the vehicle comprises the first actuator 108 and the second actuator 804, that are coupled via hydraulic lines 109 to a hydraulic pump or accumulator, with a first hydraulic sensor and a second hydraulic sensor associated with the output hydraulic lines of the hydraulic pump or accumulator. For example, the energy management system (211 or 311) interfaces with the hydraulic system, consistent with the energy management system of FIG. 2B or FIG. 2C.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The following is claimed:

1. An energy management system for a ground vehicle, the energy management system comprising:
    an internal combustion engine for providing a primary rotational energy;
    a shaft assembly having an input shaft coupled to receive the primary rotational energy, the shaft assembly having a first output shaft and a second output shaft;
    a first load coupled to the first output shaft for receipt of at least a first portion of the primary rotational energy, the first load comprising a hydraulic load of an implement of the vehicle;
    a generator coupled to the second output shaft to receive a second portion of the primary rotational energy, the generator converting the received primary rotational energy into electrical energy;
    a motor for converting the electrical energy into secondary rotational energy at a rotor of the motor;
    a second load coupled to the rotor for receipt of the secondary rotational energy, the second load associated with propulsion of the vehicle with respect to the ground;
    a vehicle controller for evaluation of a total vehicle load comprising the first load and the second load to determine if the primary rotational energy of the internal combustion engine meets or exceeds the total vehicle load;
    an energy storage system for storing energy in a direct current (DC) form;
    a dual inverter comprising primary alternating current (AC) terminals, secondary AC terminals, and DC terminals; the DC terminals coupled to the energy storage system, the primary AC terminals coupled to the generator and the secondary AC terminals coupled to the motor, the dual inverter generating motor command data for the motor in a torque control mode or speed control mode based on data messages of the vehicle controller; and
    an energy management control module configured for communication with the vehicle controller, the energy management control module configured to generate generator command data for the generator in a power command mode, wherein the energy management control module supports the following control modes:
    a first mode comprising the power command mode and a stored power extraction mode that are mutually exclusive sub-modes for any sampling interval of one or more sampling intervals during a time period, where:
        in the power command mode for a sampling interval, the energy management controller is configured to generate generator command data for the generator based on a commanded motor torque and an energy storage power command to store energy in the energy storage system if the primary rotational energy of the internal combustion engine meets or exceeds the total vehicle load for the sampling interval; and
        in the stored power extraction mode for the sampling interval or the next sampling interval following the sampling interval, the primary rotational energy of the internal combustion engine is supplemented by stored electrical energy in the energy storage system to provide electrical energy and the motor command data, via the dual inverter, to the motor to support the second load as a component of the total vehicle load if primary rotational energy of the internal combustion engine does not meet or exceed the total vehicle load for the sampling interval or the next sampling interval; and
    a second mode configured to determine an observed state of charge (SOC) of the energy storage system with respect to a target SOC to determine whether to provide electrical energy to charge the energy storage system or to introduce a switched electrical load to discharge the energy storage system for the sampling interval or a following time interval.

2. The energy management system according to claim 1 wherein the dual inverter comprises:
    a data bus;
    an electronic data processor coupled to the data bus;
    a data storage device coupled to the data bus, the data storage device storing the energy management control module as software instructions within the data storage device for execution or processing by the electronic data processor.

3. The energy management system according to claim 1 wherein hydraulic load comprises an electrohydraulic actuator for controlling movement of the implement; and further comprising:

a sensor configured to measure the hydraulic implement load, where the sensor is associated with the electrohydraulic actuator.

4. The energy management system according to claim 3 wherein the sensor comprises a sensor selected from the group consisting of a hydraulic flow rate sensor, a hydraulic pressure sensor, and a boom lift electrohydraulic pressure sensor.

5. The energy management system according to claim 1 wherein in the first mode in the stored power extraction mode the primary rotational energy of the internal combustion engine is supplemented by stored electrical energy in the energy storage system to provide electrical energy to the generator in a motoring mode to support the first load as a component of the total vehicle load if primary rotational energy of the internal combustion engine does not meet or exceed the total vehicle load.

6. The energy management system according to claim 1, wherein the energy management control module is configured to generate one or more changes to a generator command data, a motor command data, or an SOC command data by a control algorithm to reduce peak load of the total vehicle load for any sampling interval by drawing stored energy from an energy storage system for the sampling interval or next sampling interval or a window following the sampling interval based on: (a) a commanded engine speed commanded by the vehicle controller, (b) a commanded torque or commanded speed of the motor that is commanded by the vehicle controller; (c) a present total vehicle load; (d) a commanded generator power, and (e) a state of charge (SOC) of an energy storage system comprising an observed SOC and a commanded SOC of the energy storage system.

7. The energy management system according to claim 1 wherein the energy management control module further supports:
a third mode configured to control a DC link voltage at the DC output terminals of the dual inverter pursuant to a voltage control mode.

8. The energy management system according to claim 7 wherein the third mode comprises sending a net power command (P*net) to the energy storage system from the inverter.

9. The energy management system according to claim 1 wherein the energy management controller comprises:
a power module storable in a data storage device to support the first mode, the power module comprising a limiter for limiting power output to a lower limit and an upper limit; and
a state of charge (SOC) module storable in a data storage device to support the second mode.

10. The energy management system according to claim 9 wherein SOC data outputted by the SOC module is configured to provide an input to the power module for generator power commanded output.

11. An energy management system for a hybrid loader vehicle, the energy management system comprising:
an internal combustion engine for providing a primary rotational energy;
a shaft assembly comprising a gearbox having an input shaft coupled to receive the primary rotational energy, the shaft assembly having a first output shaft and a second output shaft;
a first load coupled to the first output shaft for receipt of at least a first portion of the primary rotational energy, the first load comprising a hydraulic implement load of a loader, the hydraulic implement load having a first electrohydraulic cylinder for lifting or lowering a boom of the loader and a second electrohydraulic cylinder for tilting a bucket of the loader;
a generator coupled to the second output shaft to receive a second portion of the primary rotational energy, the generator converting the received primary rotational energy into alternating current (AC) electrical energy;
a motor for converting the electrical energy into secondary rotational energy at a rotor of the motor;
a second load coupled to the rotor for receipt of the secondary rotational energy;
an energy storage system for storing energy in a direct current (DC) form;
a dual inverter comprising primary alternating current (AC) terminals, secondary AC terminals, and DC terminals; the DC terminals coupled to the energy storage system, the primary AC terminals coupled to the generator and the secondary AC terminals coupled to the motor;
a vehicle controller for management of a total load comprising the first load and the second load, the vehicle controller configured to determine if the primary rotational energy of the internal combustion engine meets or exceeds the total load; and
an energy management control module configured for communication with the vehicle controller, the energy management control module configured to generate generator command data for the generator in a power command mode, wherein the energy management control module supports:
a first mode comprising the power command mode and a stored power extraction mode that are mutually exclusive sub-modes for any sampling interval of one or more sampling intervals during a time period, where:
in the power command mode for a sampling interval, the energy management controller is configured to generate generator command data for the generator based on a commanded motor torque and an energy storage power command to store energy in the energy storage system if the primary rotational energy of the internal combustion engine meets or exceeds the total vehicle load for the sampling interval; and
in the stored power extraction mode for the sampling interval or the next sampling interval following the sampling interval, the primary rotational energy of the internal combustion engine is supplemented by stored electrical energy in the energy storage system to provide electrical energy to the motor to support the second load as a component of the total load if the primary rotational energy of the internal combustion engine does not meet or exceed the total load; and
a second mode configured to determine an observed state of charge (SOC) of the energy storage system with respect to a target SOC to determine whether to provide electrical energy to charge the energy storage system or to introduce a switched electrical load to discharge the energy storage system for the sampling interval or a following time interval.

12. The energy management system according to claim 11, wherein the energy management control module is configured to generate one or more changes to a generator command data, a motor command data, and an SOC command data by a control algorithm to reduce peak load for any sampling interval by drawing stored energy from an energy storage system for the sampling interval or next sampling interval or a window following the sampling interval based on: (a) an engine power capability of the internal combustion engine at a commanded speed that is commanded by the vehicle controller, (b) a commanded torque or commanded speed of the motor that is commanded by the vehicle controller; (c) a present total vehicle load observed by sensors associated with the first electrohydraulic cylinder and the second electrohydraulic cylinder; (d) a commanded power of the generator commanded by the energy management module, and (e) a state of charge (SOC) of an energy storage system comprising an observed SOC and a commanded SOC of the energy storage system.

13. The energy management system according to claim 10 wherein the second load is associated with propulsion of the loader vehicle with respect to the ground.

14. The energy management system according to claim 11 wherein the dual inverter comprises:
   a data bus;
   an electronic data processor coupled to the data bus;
   a data storage device coupled to the data bus, the data storage device storing the energy management control module as software instructions within the data storage device for execution or processing by the electronic data processor.

15. The energy management system according to claim 11 wherein the energy management control module further supports:
   a third mode configured to control a DC link voltage at the DC output terminals of the dual inverter pursuant to a voltage control mode.

\* \* \* \* \*